United States Patent
Yu et al.

(10) Patent No.: US 6,834,278 B2
(45) Date of Patent: Dec. 21, 2004

(54) TRANSFORMATION-BASED METHOD FOR INDEXING HIGH-DIMENSIONAL DATA FOR NEAREST NEIGHBOUR QUERIES

(75) Inventors: Cui Yu, Singapore (SG); Beng-Chin Ooi, Singapore (SG); Kian-Lee Tan, Singapore (SG)

(73) Assignee: Thothe Technologies Private Limited, Singapore (SG)

( * ) Notice: Subject to any disclaimer, the term of this patent is extended or adjusted under 35 U.S.C. 154(b) by 96 days.

(21) Appl. No.: 09/825,700

(22) Filed: Apr. 5, 2001

(65) Prior Publication Data

US 2002/0147703 A1 Oct. 10, 2002

(51) Int. Cl.$^7$ .............................................. G06F 17/30
(52) U.S. Cl. ........................ 707/2; 707/101; 707/103 Z
(58) Field of Search ................................ 707/2–3, 100, 707/101, 103 R, 103 Z

(56) References Cited

U.S. PATENT DOCUMENTS

| | | | | |
|---|---|---|---|---|
| 4,713,817 A | * | 12/1987 | Wei | 714/758 |
| 5,583,666 A | * | 12/1996 | Ellson et al. | 358/518 |
| 5,647,058 A | * | 7/1997 | Agrawal et al. | 707/1 |
| 6,154,746 A | * | 11/2000 | Berchtold et al. | 707/100 |
| 6,477,553 B1 | * | 11/2002 | Druck | 708/313 |

OTHER PUBLICATIONS

Zaniolo et al. (Advance Database Systems) 1997, pp. 276–283.*

* cited by examiner

Primary Examiner—Safet Metjahic
Assistant Examiner—Haythim J. Alaubaidi
(74) Attorney, Agent, or Firm—Pillsbury Winthrop LLP

(57) ABSTRACT

We disclose a transformation-based method for indexing high-dimensional data to support similarity search. The method, iDistance, partitions the data into clusters either based on some clustering strategies or simple data space partitioning strategies. The data in each cluster can be described based on their similarity with respect to a reference point, and hence they can be transformed into a single dimensional space based on such relative similarity. This allows us to index the data points using a B$^+$-tree structure and perform similarity search using range search strategy. As such, the method is well suited for integration into existing DBMSs. We also study two data partitioning strategies, and several methods on selection of reference points. We conducted extensive experiments to evaluate iDistance, and our results demonstrate its effectiveness.

11 Claims, 26 Drawing Sheets

FIG. 2

1. start with a small search sphere
2. if $K$ nearest neighbors are found and
    all data subspaces intersecting
        the current query space have been checked
3.     exit
4. else
5.     enlarge search sphere and continue searching.
6.     goto 2.

FIG. 5 iDistanceKNN $(q, \Delta r, max\_r)$
$r = 0$;
initialize $lp[]$, $rp[]$, $oflag[]$;
while $|S| < K$ and $r < max\_r$
    $r = r + \Delta r$;
    SearchO$(q, r)$;
end iDistanceKNN;

SearchO$(q, r)$
for $i = 0$ to $m - 1$
    if not $oflag[i]$ /* if $O_i$ has not been searched before */
        $oflag[i] = 1$;
        $dis = \mathbf{dist}(O_i, q)$;
        if $sphere(O_i, dist\_max_i)$ contains $q$
            $lnode = \mathbf{LocateLeaf}(btree, i * c + dis)$;
            $lp[i] = \mathbf{SearchInward}(lnode, i * c + dis - r)$;
            $rp[i] = \mathbf{SearchOutward}(lnode, i * c + dis + r)$;
        else if $sphere(O_i, dist\_max_i)$ intersects $sphere(q, r)$
            $lnode = \mathbf{LocateLeaf}(btree, dist\_max_i)$;
            $lp[i] = \mathbf{SearchInward}(lnode, i * c + dis - r)$;
    else if $sphere(O_i, dist\_max_i$ ) intersects $sphere(q, r)$
        if $lp[i]$ not nil
            $lp[i] = \mathbf{SearchInward}(lp[i] \rightarrow leftnode, i * c + dis - r)$;
        if $rp[i]$ not nil
            $rp[i] = \mathbf{SearchOutward}(rp[i] \rightarrow rightnode, i * c + dis + r)$;
end SearchO;

SearchInward$(node, ivalue)$
for each entry $e_i$ in $node$
    if $|S| = K$
        $f = $ furthest object in $S$ from $q$;

if $\mathbf{dist}(e_i, q) < \mathbf{dist}(f, q)$
        $S = S - f$;
        $S = S \cup e_i$;
    else
        $S = S \cup e_i$;

if $e_i.\text{key} < ivalue$
        $node = \mathbf{SearchInward}(node \rightarrow leftnode, i * c + dis - r)$;
    if end of partition is reached
        $node = \mathbf{nil}$;
return($node$);
end SearchInward;

The bounding area by these arches are the affected searching area of kNN(Q,r).

TRANSFORMATION-BASED METHOD FOR INDEXING HIGH-DIMENSIONAL DATA FOR NEAREST NEIGHBOUR QUERIES

2 BACKGROUND OF THE INVENTION

Broadly speaking, the invention relates to the field of Computer Science. Specifically, it is concerned with the design of efficient database indexing structures to speed up the access of high dimensional data points from a large repository of points stored in a computer. The points to be accessed are those that nearest to the query point.

Database management systems (DBMSs) are widely accepted as a standard tool for manipulating large volumes of data on secondary storage. To retrieve the stored data quickly, databases employ structures known as indexes. With an index, the volume of data to be fetched and processed in response to a query can be significantly reduced. In practice, large database files must be indexed to meet performance requirements.

In recent years, database systems have been increasingly used to support new applications, such as CAD/CAM systems, spatial information systems and multimedia information systems. These applications are far more complex than the traditional business applications. In particular, data objects are typically represented as high-dimensional points, and queries require identifying points that best match the query points (e.g., nearest neigbors, similarity queries), rather than exact matches. Traditional single dimensional indexing techniques, such as the $B^+$-tree and its variants, cannot adequately support these applications. As such, new indexing mechanisms must be developed.

Many indexing methods for multi-dimensional data have been developed in the arts. Early works include hierarchical tree structures (such as R-trees), linear quad-trees and grid-files. Tree-based indexing methods perform well for small number of dimensions (and hence large fan-out of the tree nodes). However, as the number of dimensions increases, the fan-out of the tree nodes reduces. The small fan-out leads to increased overlap between node entries as well as a taller tree. The consequence is more paths will have to be traversed, and more data will have to be fetched, resulting in a rapid deterioration in performance. Linear quad-trees and grid-files also work well for low dimensionalities, but the response time explodes exponentially for high dimensionalities. It turns out that for high dimensionality, the simple strategy of examining all data objects remains the best strategy.

More recent efforts address this problem by reducing the dimensionality of the indexing attribute. One direction is to reduce the dimensionality of the data by projecting high-dimensional points on the hyperplane containing the axis. An algorithm (by Friedman, et. al. *An algorithm for finding nearest neighbors,* IEEE Transaction on Computers, Vol C-24, pp. 1000–1006) is to truncate the high dimension data. Another algorithm (by B. C. Ooi, et. al. *Indexing the Edges—A Simple and Yet Efficient Approach to Indexing High-Dimensional Indexing,* Symposium on Principles of Database Systems, 2000, pp. 166–174) is to transform the high dimension data into a single dimension value based on the maximum or minimum value of the dimensions. This work, however, is designed to support window queries, and cannot be easily extended to support nearest neighbor queries (as the concept of distance/similarity is not built in). The effectiveness of techniques in this category can be reduced as searching on the projections produces false drops.

Another direction is to group high dimensional data into smaller partitions so that the search can be performed by sequentially scanning the smaller number of buckets. This approach is not expected to scale for large number of high-dimensional data as the number of partitions will be too large. Moreover, it may miss some answers (e.g., Goldstein, et. al. *Contrast plots and p-sphere trees: space vs. time in nearest neighbor searches,* 26th International Conference on Very Large Databases, 2000, pp. 429–440). Yet another direction is to specifically design indexes that facilitates metric-based query processing. However, most of the current work have been done on high-dimensional indexing structures (which suffers from poor performance as the number of dimensions becomes large).

Therefore, it is a problem in this art to reduce the dimensionality of a high-dimensional database such that no answers will be missed and the number of false drops is kept minimum when answering a query.

3 BRIEF SUMMARY OF THE INVENTION

The invention is a transformation-based method for indexing high-dimensional data for nearest neighbor queries. The method maps high-dimensional points into single dimensional space using a three step algorithm. First, the data in the high dimensional space is partitioned. Second, for each partition, a point is identified to be a reference point. Third, the distance between each point in the partition and the reference point is computed. The distance, together with the partition, essentially represents the high-dimensional point in the single dimensional space. Nearest neighbor queries in the high dimensional space has to be transformed into a sequence of range queries on the single dimensional space.

The invention has several advantages over existing techniques. First, the mapping function that we used is simple and computationally inexpensive. Second, because distance is a single dimensional vector, we can exploit single dimensional indexing structure to facilitate speedy retrieval. This means that the technique can be easily deployed in commercial database management systems that already provide support for single dimensional indexing. Third, the invention can produce fast approximate nearest neighbors quickly, and the answers are continuously refined until the nearest neighbors are obtained. We note that most of the existing approaches cannot prduce any answers until all the nearest neighbors are returned. Fourth, the invention is space efficient.

4 BRIEF DESCRIPTION OF THE SEVERAL VIEWS OF THE DRAWINGS

FIG. 1 illustrates the flow of information and control in iDistance.

FIG. 2 gives an algorithmic description of the basic KNN searach algorithm for distance-based query processing.

FIG. 5 shows the KNN search algorithm on iDistance.

5 DETAILED DESCRIPTION OF THE INVENTION

We disclose here the invention of a method that efficiently retreives the nearest neighbors of a given query point from a database of high-dimensional points.

Figure 1:
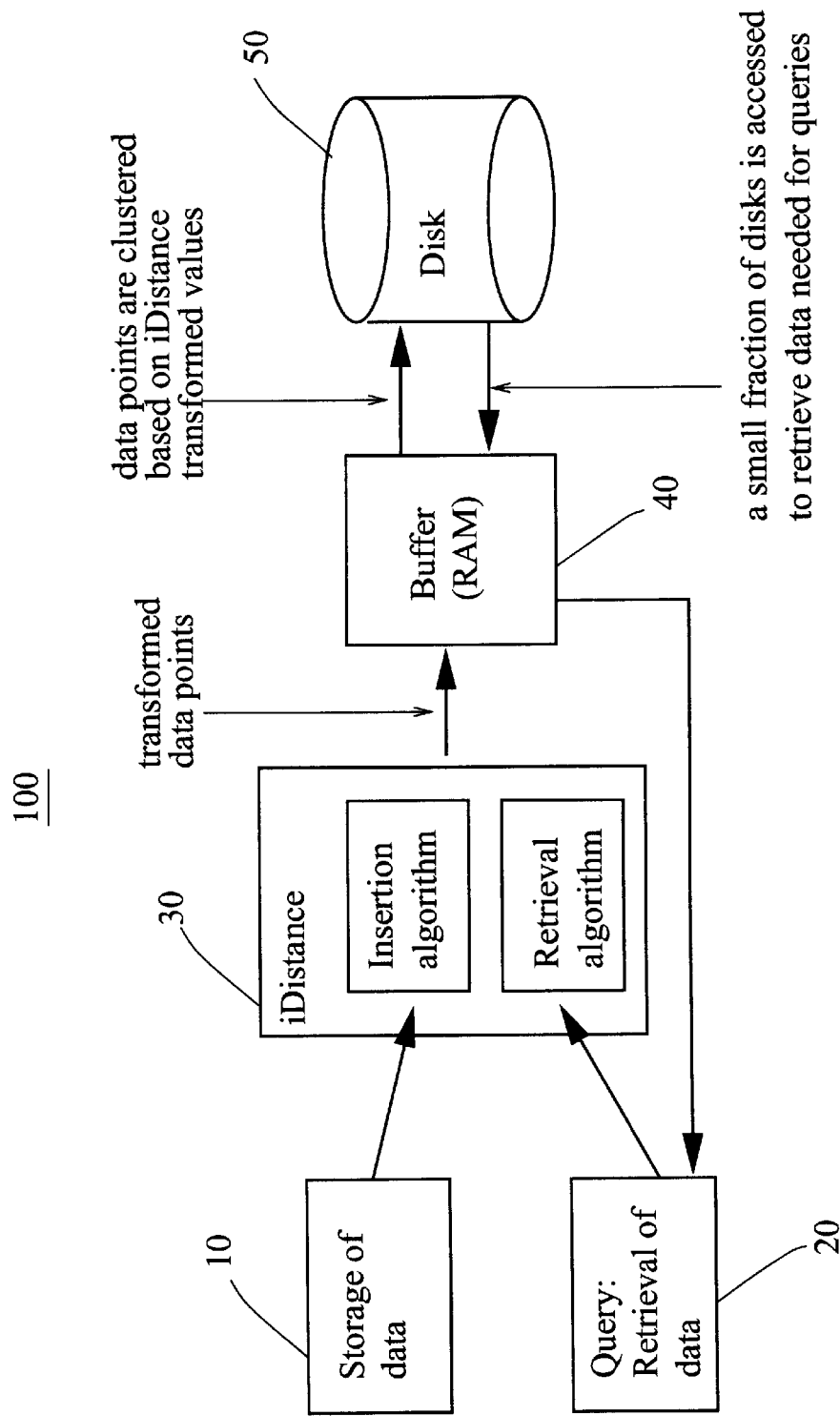

The invention, iDistance, partitions the data in the high-dimensional space into clusters, each with an associated reference point; and uses the distances between points in a cluster and its reference point as the representative index keys for the points. Because distance is single dimension metric, the points can be ordered and indexed using a single dimensional indexes. In our implementation, we employ the $B^+$-tree structure since it is supported by all commercial DBMSs. Thus, iDistance can be readily adopted for use. Similarity search on the high-dimensional space can also be performed as a sequence of range queries on the single dimensional space.

iDistance determines the way the data is stored on disks through the $B^+$-tree, and the efficiency of the method affects the processing time in retrieving data from disks to the buffer (RAM). The effects are the storage and retrieval time of data from disks and the efficient use of buffer space by fetching just enough data for answering user queries. FIG. 1 illustrates the flow of information and control 100, and the effects of iDistance on data retrieval time. As shown in the figure, there are two parts: storage of data 10 and retrieval of data 20. When high dimensional points have to be stored, they are first transformed by iDistance 30 into single dimensional values in RAM 40. These single dimensional values are then inserted into a $B^+$-tree on disks 50. Since a $B^+$-tree clusters data that have similar values together, this effectively clusters high dimensional points that are related together. On the other hand, when we are retrieving data 20, the query (also in high dimensional space) will also be transformed under iDistance 30 into a set of increasingly larger range subqueries on the single dimension space in RAM 40. These subqueries are then used to acess the data from the disk-based $B^+$-tree 50. We note that only a fraction of the $B^+$-tree will be searched, and only the relevant portions of the disk pages 50 will be transferred into RAM 40. The relevant data are refined and returned as answers to the query.

In the following discussion, we consider a unit d-dimensional space, i.e., points are in the space $([0,1],[0,1], \ldots, [0,1])$. In other words, all attribute values are mapped into $[0,1]$ domain. We denote an arbitrary data point in the space as $p(x_1, x_2, \ldots, x_d)$. Let dist be a metric distance function for pairs of points. For our discussion, we shall use the Euclidean distance as the distance function, although other distance functions may be more appropriate for certain applications. Let $p_1(x_1, x_2, \ldots x_d)$, $p_2(y_1, y_2, \ldots, y_d)$ and $p_3(z_1, z_2, \ldots z_d)$ be three data points in a unit d-dimensional space. The distance between $p_1$ and $p_2$ is defined as $$dist(p_1, p_2) = \sqrt{(x_1 - y_1)^2 + (x_2 - y_2)^2 + \ldots + (x_d - y_d)^2}$$

This distance function, dist, has the the following properties:

| | |
|---|---|
| $dist(p_1,p_2) = dist(p_2,p_1)$ | $\forall p_1, p_2 \in \text{Points}$ |
| $dist(p_1,p_2) = 0$ | $\forall p_1 \in \text{Points}$ |
| $0 < dist(p_1,p_2) \leq \sqrt{d}$ | $\forall p_1, p_2 \in \text{Points}; p_1 \neq p_2$ |
| $dist(p_1,p_3) \leq dist(p_1,p_2) + dist(p_2,p_3)$ | $\forall p_1, p_2, p_3 \in \text{Points}$ |

The last formula defines the triangular inequality, and provides a condition for selecting candidates based on metric relationship.

5.1 iDistance iDistance comprises four steps. First, the high dimensional data is split into a set of partitions. This is done based on either some clustering strategies or simple data space partitioning strategies. Second, a reference point in each partition is identified. We note that the reference point need not be a data point. For a reference point, $O_i$, its data space is defined by the points nearest and furthest to it. The maximum distance dist_max of the points in the partition to $O_i$ is the maximum radius of the partition sphere, while the minimum distance dist_min of the points in the partition to $O_i$ is the distance of the nearest point to $O_i$. The region bounded by the spheres obtained from these two radii defines the effective data space that need to be searched. In the following discussion, we shall assume that the data space has been partitioned, and the reference point in each partition has been determined. These issues shall be discussed in the Section 5.3. Without loss of generality, let us suppose that we have m partitions, $P_0, P_2, \ldots, P_{m-1}$ and their corresponding reference points, $O_0, O_2, O_{m-1}$.

Third, all data points are represented in a single dimension space as follows. A data point $p(x_1, x_2, \ldots, x_d)$, $0 \leq x_j \leq 1$, $1 \leq j \leq d$, has an index key, y, based on the distance from the nearest reference point $O_i$ as follows:

$y = i*c + dist(p, O_i)$ where $dist(O_i, p)$ is a distance function returning the distance between $O_i$ and p, and c is some constant to stretch the data ranges. Essentially, c serves to partition the single dimension space into regions so that all points in partition $P_i$ will be mapped to the range $[i*c, (i+1)*c)$. Thus, the value of c should be sufficiently large enough for the purpose.

Fourth, the transformed points are indexed using any single dimensional index structure. We use the $B^+$-tree since it is available in all commercial DBMS. In our implementation of the $B^+$-tree, leaf nodes are linked to both the left and right siblings. This is to facilitate searching the neighboring nodes when the search region is gradually enlarged.

Besides the B$^+$-tree, a small auxiliary data structure is required to store the m reference points and their respective nearest and furthest radii that define the data space.

It is clear that iDistance is lossy in the sense that multiple data points in the high dimensional space may be mapped to the same value in the single dimensional space. For example, different points within a partition that are equidistant from the reference point have the same transformed value. However, as we shall see in the experimental study, iDistance can still lead to superior performance over linear scan and existing methods.

5.2 Similarity Search in iDistance

Before we look at similarity search in iDistance, let us first look at how similarity search can be performed for metric-based indexing in the high-dimensional space.

The similarity search algorithm (in high dimensional space) is based on the following observation: data points in a partition can be referenced via its reference point, $O_i$, in terms of their proximity or distance to it. Formally, the inequality relationship between the reference point, data point and query point enables us to retrieve the required data correctly.

Theorem 1

Let q be a query object, $O_i \in$ Points be a reference point for partition i, and $p_1 \in$ Points be a given data point in partition i. Moreover, let querydist(q) be the radius of the query sphere about q. If $dist(p_1,q) \leq querydist(q)$ holds, then it follows that $dist(O_i,q) - querydist(q) \leq dist(O_i,p) \leq dist(O_i,q) + querydist(q)$.

Proof

Based on the definition of triangle inequality, we have $dist(O_i,q) \leq dist(O_i,p_i) + dist(p_i,q)$. Since $dist(p_i,q) \leq querydist(q)$, therefore, $dist(O_i,q) \leq dist(O_i,p_i) + querydist(q)$. And also, $dist(O_i,q) - querydist(q) \leq dist(O_i,p_i)$. □

Figure 3:
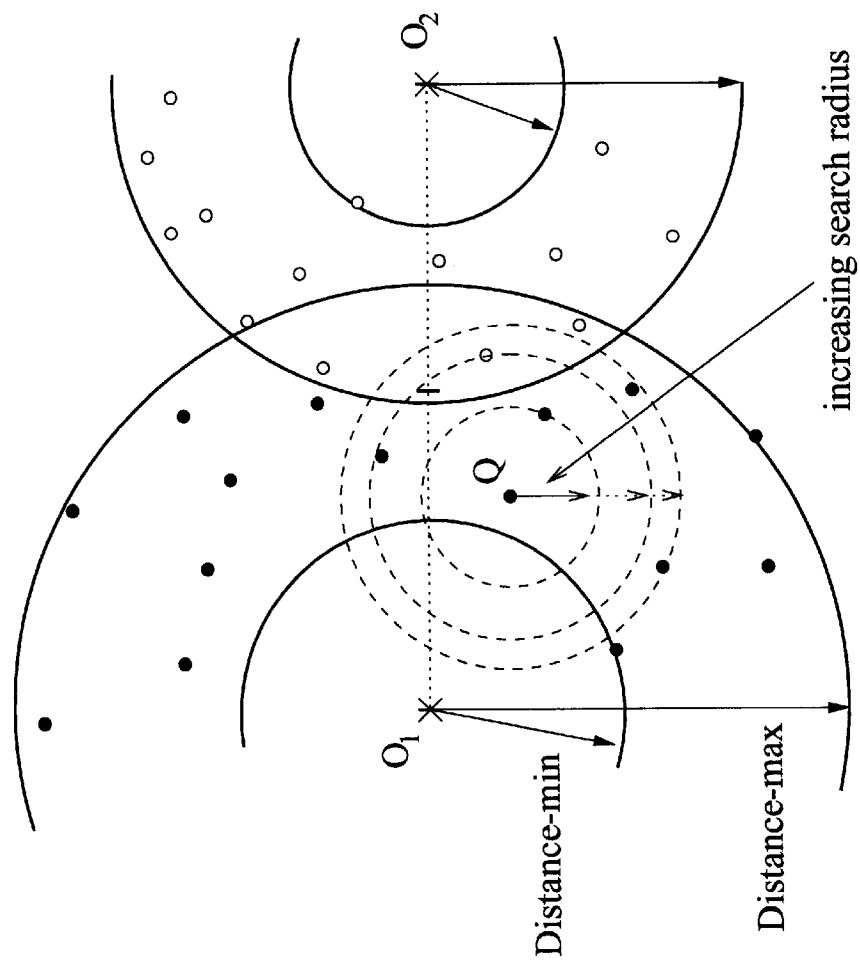
FIG. 3 illustrates the effects of enlarging search regions for locating KNNs.

To search for the K nearest neighbors of q, the distance of the Kth nearest neighbor to q defines the minimum radius required for retrieving the complete answer set. Unfortunately, such a distance cannot be predetermined with 100% accuracy. Hence, an iterative approach that examines increasingly larger sphere in each iteration can be employed (see FIG. 2). The algorithm (in high-dimensional space) works as follows. Given a query point q, finding K nearest neighbors (NN) begins with a query sphere defined by a relatively small radius about q, querydist(q). All data spaces that intersect the query sphere have to be searched. Gradually, the search region is expanded till all the K nearest points are found and all the data subspaces that intersect with the current query space are checked. We note that starting the search query with a small initial radius keeps the search space as tight as possible, and hence minimizes unnecessary search (had a larger radius that contains all the K nearest points been used). FIG. 3 illustrates two data partitions referenced by $O_1$ and $O_2$ and the relationship between them and query q.

Figure 4:
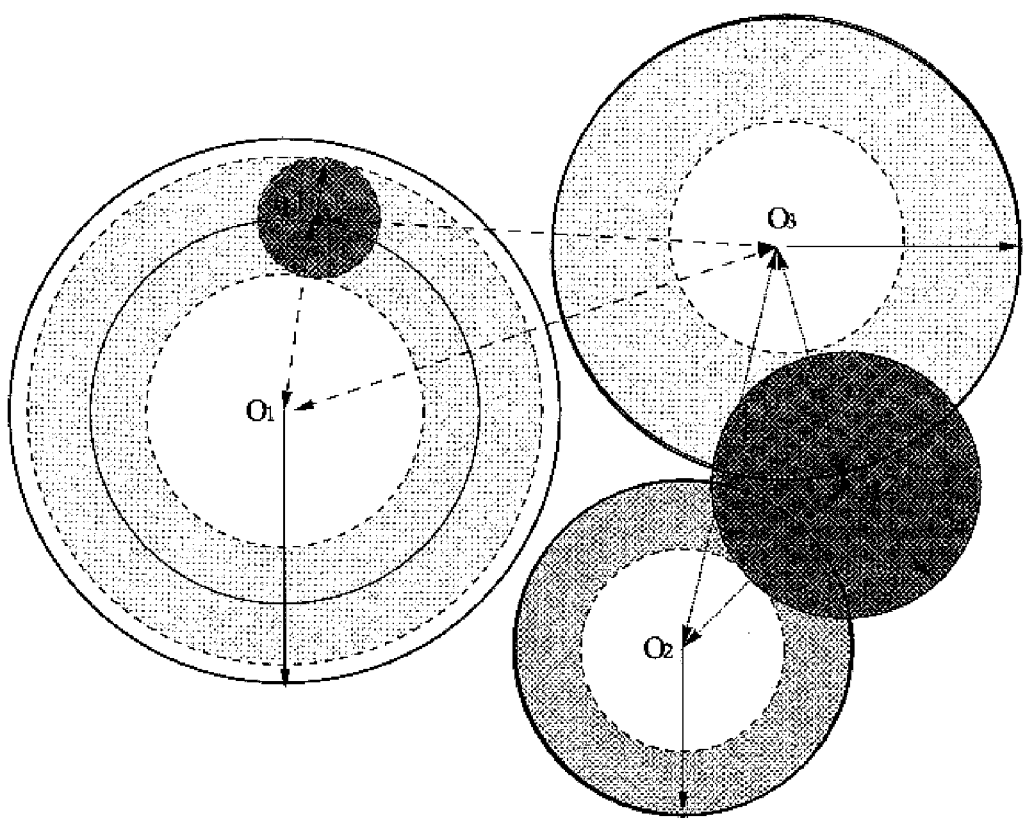
FIG. 4 shows the search regions for NN queries $q_1$ and $q_2$.

We are now ready to look at the KNN algorithm for iDistance. Let us first look at the search regions. Let $O_i$ be the reference point of partition i, and dist_max$_i$ and dist_min$_i$ be the maximum and minimum distance between the points in partition i and $O_i$ respectively. Let q be a query point and querydist(q) be the radius of the sphere obtained about q. For iDistance, in conducting NN search, if $dist(O_i,q) - querydist(q) \leq dist\_max_i$, then partition i has to be searched for NN points. The range searching within an affected partition is [max(0, dist_min$_i$),min(dist_max$_i$, dist$(O_i,q)$+querydist(q))]. FIG. 4 illustrates that for query point $q_1$, only data set $O_1$ needs to be searched, while for query point $q_2$, both $O_2$ and $O_3$ have to be searched. From the figure, it is clear that all points along a fixed radius have the same value after transformation due to the lossy transformation of data points into distance with respect to the reference points. As such, the shaded regions are the areas that need to be checked.

FIG. 5 summarizes the algorithm for KNN with iDistance method. Like its high-dimensional counterpart, it begins by searching a small "sphere", and incrementally enlarges the search space till all K nearest neighbors are found.

The algorithm iDistanceKNN is highly abstracted. Before examining it, let us briefly discuss some of the important routines. Since both routines SearchInward and SearchOutward are similar, we shall only explain routine SearchInward. Given a leaf node, routine SearchInward examines the entries of the node to determine if they are among the K nearest neighbors, and updates the answers accordingly. We note that because iDistance is lossy, it is possible that points with the same values are actually not close to one another—some may be closer to q, while others are far from it. If the first element (or last element for SearchOutward) of the node is contained in the query sphere, then it is likely that its predecessor with respect to distance from the reference point (or successor for SearchOutward) may also be close to q. As such, the left (or right for SearchOutward) sibling is examined. In other words, SearchInward (SearchOutward) searches the space towards (away from) the reference point of the partition. The routine LocateLeaf is a typical B$^+$-tree traversal algorithm which locates a leaf node given a search value, and hence the detailed description of the algorithm is omitted.

We are now ready to explain the search algorithm. Searching in iDistance begins by scanning the auxiliary structure to identify the reference points whose data space overlaps with the query region. The search starts with a small radius (querydist), and step by step, the radius is increased to form a bigger query sphere. For each enlargement, there are three main cases to consider.

1. The data space contains the query point, q. In this case, we want to traverse the data space sufficiently to determine the K nearest neighbors. This can be done by first locating the leaf node whereby q may be stored. (Recall that this node does not necessarily contain points whose distance are closest to q compared to its sibling nodes), and search inward or outward of the reference point accordingly.
2. The data space intersects the query sphere. In this case, we only need to search inward since the query point is outside the data space.
3. The data space does not intersect the query sphere. Here, we do not need to examine the data space.

The search stops when the K nearest neighbors have been identified from the data subspaces that intersect with the current query sphere and when further enlargement of query sphere does not change the K nearest list. In other words, all points outside the subspaces intersecting with the query sphere will definitely be at a distance D from the query point such that D is greater than querydist. This occurs when the distance of the further object in the answer set, S, from query point q is less than or equal to the current search radius r. Therefore, the answers returned by iDistance are of 100% accuracy.

We note that iDistance can provide approximate KNN answers quickly. In fact, at each iteration of algorithm iDistanceKNN, we have a set of K candidate NN points. These results can be returned to the users immediately and refined as more accurate answers are obtained in subsequent iterations. It is important to note that these K candidate NN points can be partitioned into two categories: those that we are certain to be in the answer set, and those that we have no such guarantee. The first category can be easily determined, since all those points with distance smaller than the current spherical radius of the query must be in the answer set. Users who can tolerate some amount of inaccuracy can obtain quick approximate answers and terminate the processing prematurely (as long as they are satisfied with the guarantee). Alternatively, max_r can be specified with appropriate value and used to terminate iDistanceKNN prematurely.

Theorem 2

Algorithm iDistanceKNN terminates when the KNNs are found and the answer is correct.

Proof

Let q be the query point. Let sphere(q,r) be the spherical region bounded by q with a radius of r. Let $P_k$ denote the Kth nearest point in S, the answer set. We note that algorithm iDistanceKNN terminates when dist($p_k$,q)$\leq$r. There are two scenarios during the search process:

Case 1

Sphere(q,r) Contains all the Data Points in S

Let $p_{furthest}$=furthest(S,q).

For all points p in S, such that dist(p,q)<dist($p_{furthest}$,q). Since $p_{furthest}$ is inside sphere(q,r), dist($p_{furthest}$,q)$\leq$r. We note that it is not necessary to check sphere(q,r+$\Delta$r) since any point bounded by the region with radii r and (r+$\Delta$r) will be larger than the Kth nearest point found so far. Hence the answers are the Kth nearest. and the program stops.

Case 2

S Contains a Point, u, Outside Sphere(q,r)

This occurs when a point lies in the strip that need to be checked, and it happens to be the Kth nearest so far. dist(u,q)>r, and hence r has to be enlarged: r=r+$\Delta$r Suppose the enlarged search sphere encounters a point v in the newly enlarged region, dist(v,q)<r. If dist(v,q)<dist(u,q), then u will be replaced by o. o is the point furthest from q: $p_{furthest}$=o; Now, since dist(o,q)<r, all the answers are the Kth nearest and the program stops. □

5.3 Splitting the Data Space and Selection of Reference Points

To support distance-based similarity search, we need to split the data space into partitions and for each partition, we need a representative point where all data points in that partition can be made reference to. The way the data space is split, and the choice of the reference points can affect performance. Here, we shall look at two partitioning methods, and their corresponding reference point selection heuristics.

5.3.1 Equal Partitioning of Data Space

A straight forward approach to data space partitioning is to subdivide it into equal partition. In a d-dimensional space, we have 2d hyperplanes. The method we adopted is to partition the space into 2d pyramids with the centroid of the unit cube space as their tip, and each hyperplane forming the base of each pyramid. Now, we expect equi-partitioning to be effective if the data are uniformly distributed.

Figure 6:
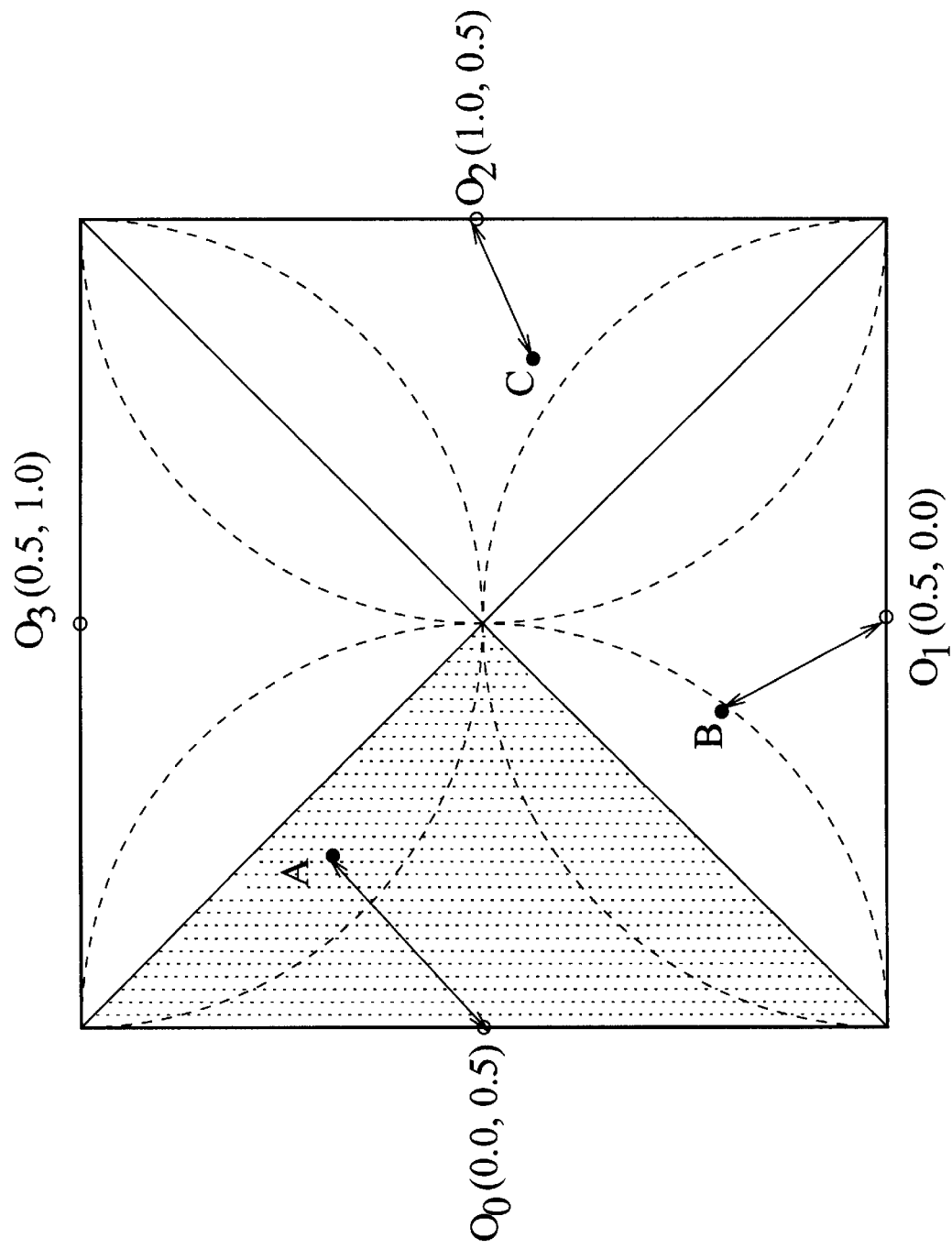
FIG. 6 illustrates the space partitioning with (centroids of (d-1)-Hyperplane, closest distance) combination.

We note that within one partition, the maximal distance to a hyperplane center, dist_max, can be as large as $0.5*\sqrt{2}\sqrt{d-1}$. Each of the hyperspheres with radius dist_max overlaps with one another in unit cube space. We study the following possible reference points, where the actual data space of hyperspheres do not overlap:

1. Centroid of hyperplane, Closest Distance. The centroid of each hyperplane can be used as a reference point, and the partition associated with the point contains all points that are nearest to it. FIG. 6 shows an example in 2-d space. Here, $O_1$, $O_2$, $O_3$ and $O_4$ are the reference points, and point A is closest to $O_1$ and so belongs to the partition associated with it (the shaded region).

Moreover, as shown, the actual data space is disjoint though the hyperspheres overlap.

Figure 7A:
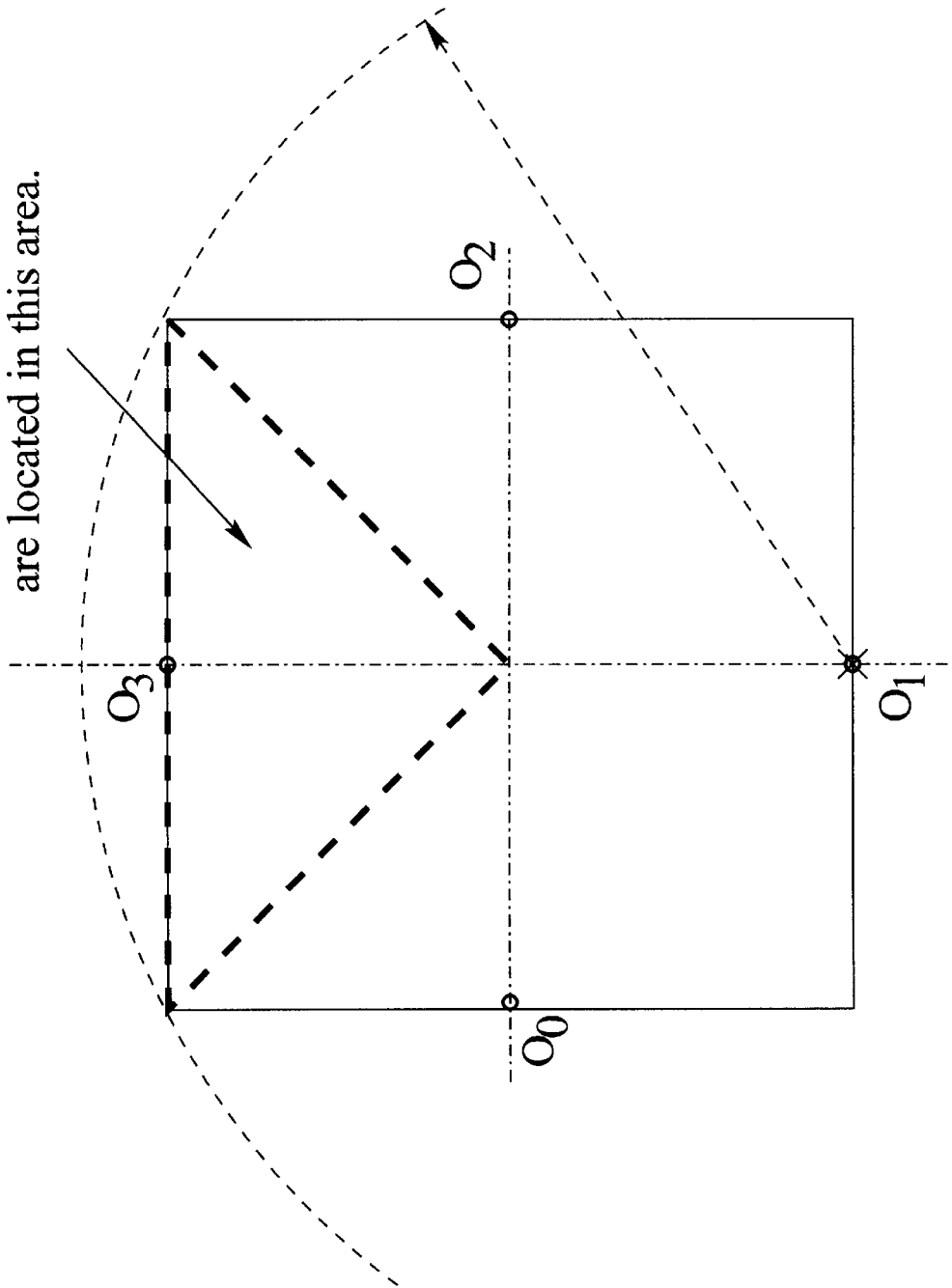
FIGS. 7A-7B illustrate the space partitioning by (centroid, furthest distance) combination, and the query space reduction respectively.
Figure 7B:
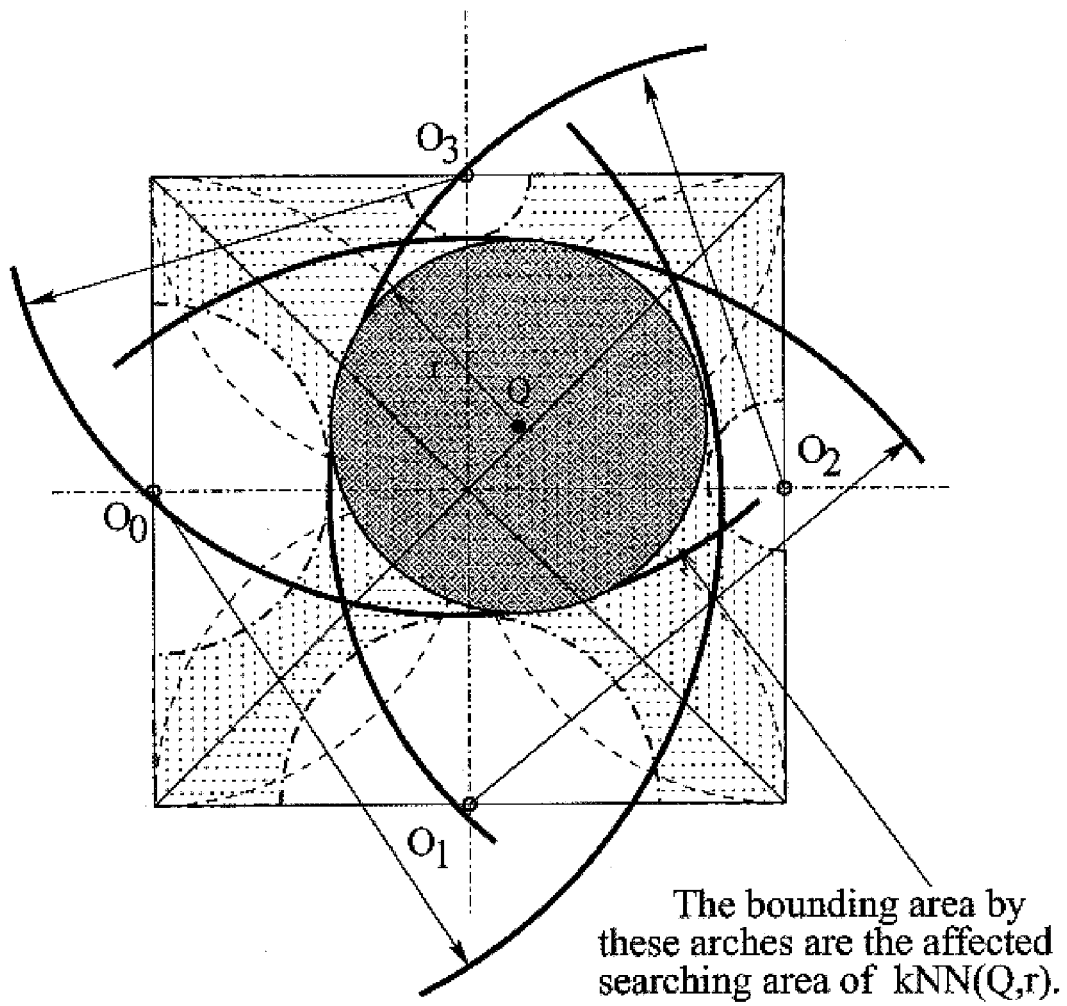

2. Centroid of hyperplane, Furthest Distance. The centroid of each hyperplane can be used as a reference point, and the partition associated with the point contains all points that are furthest from it. FIGS. 7A-7B show an example in 2-d space of the space partitioning by the method, and the reduction in query space respectively. As shown, the. affected area can be greatly reduced (as compared to the closest distance counterpart.

Figure 8A:
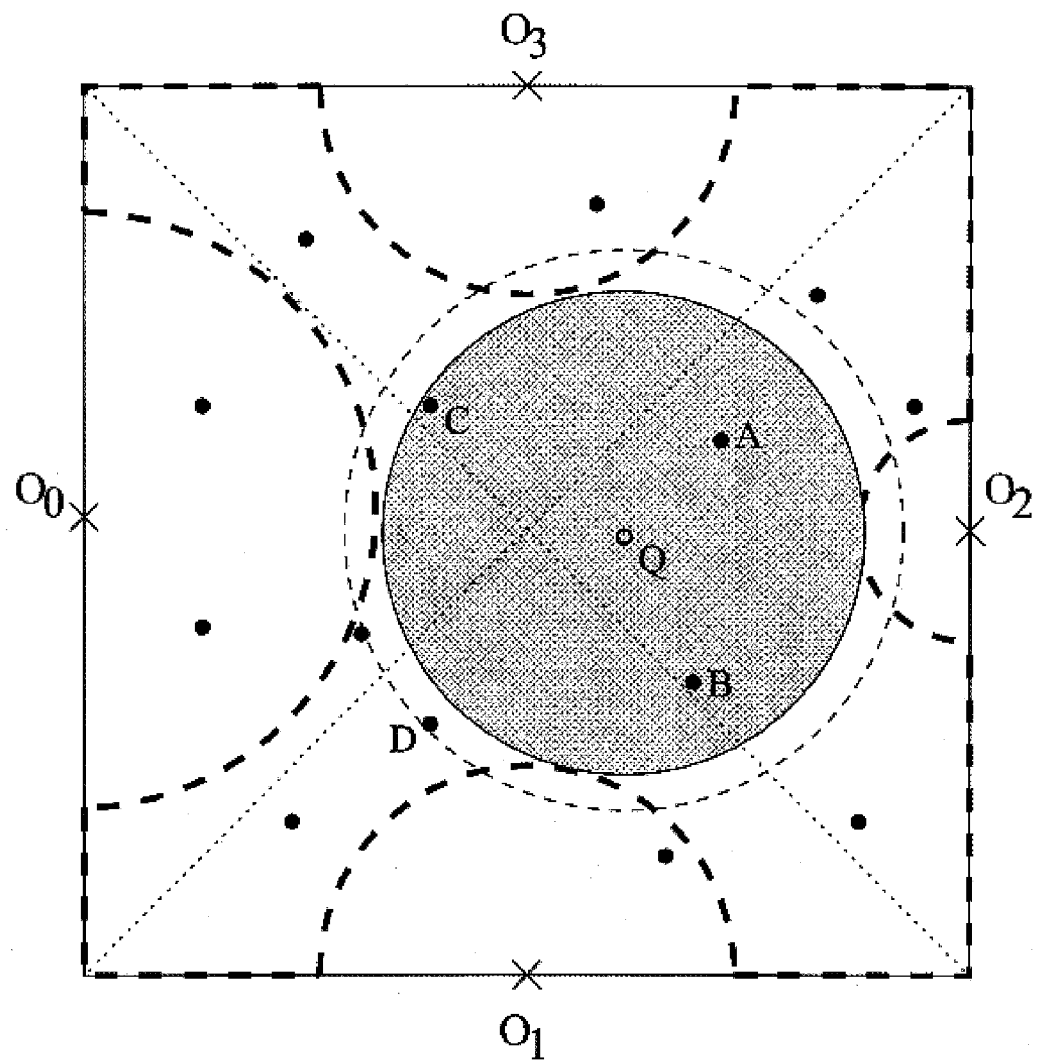
FIGS. 8A-8B illustrate the space partitioning by (external point, closest distance) combination, and the query space reduction respectively.
Figure 8B:
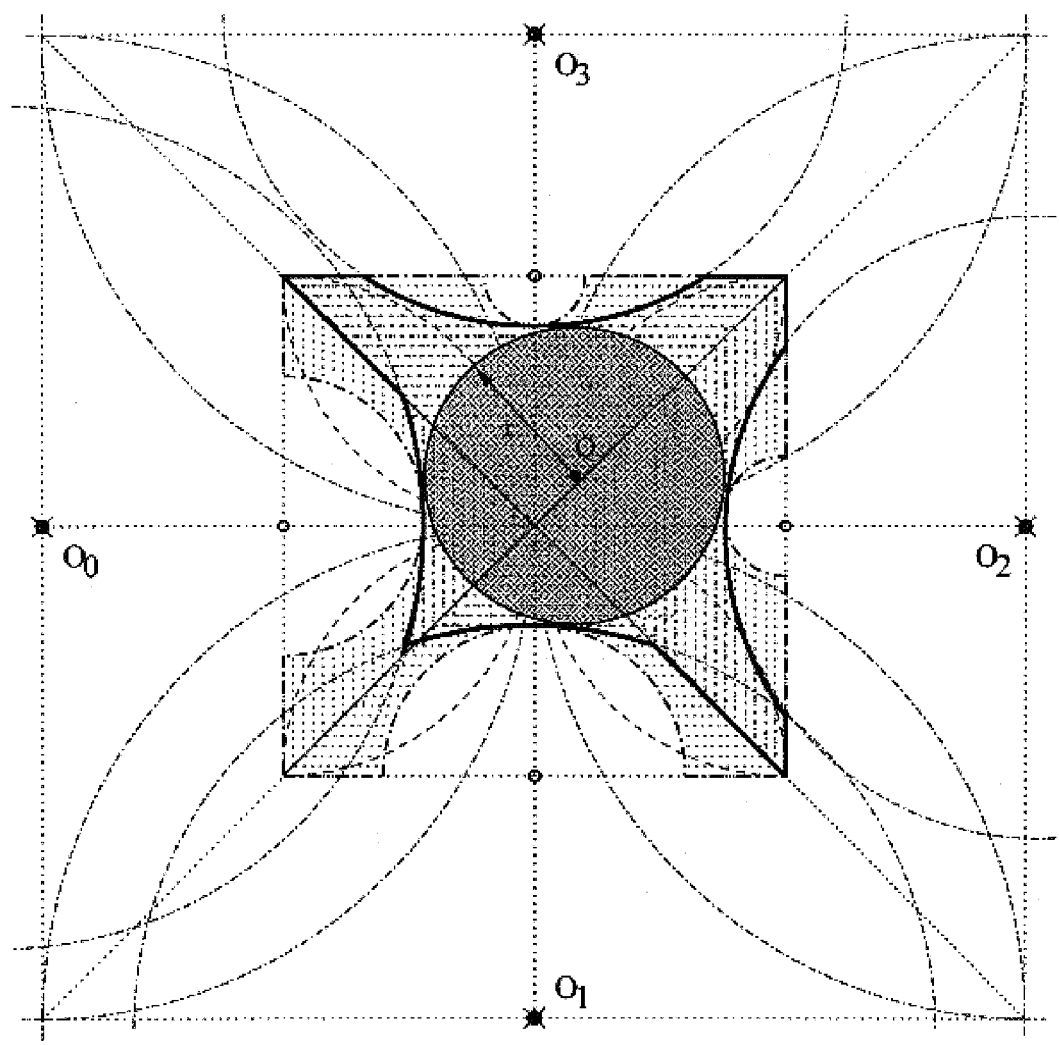

3. External point. Any point along the line formed by the centroid of a hyperplane and the centroid of the corresponding data space can also be used as a reference point. (We note that the other two reference points are actually special cases of this.) By external point, we refer to a reference point that falls out of the data space. This heuristics is expected to perform well when the affected area is quite large, especially when the data are uniformly distributed. We note that both closest and furthest distance can also be supported. FIGS. 8A-8B show an example of closest distance for 2-d space, and the reduction in query space respectively. Again, we observe that the affected space under external point is reduced (compared to using the centroid of the hyperplane).

While the data space does not change, the index value of data points will change accordingly. Such characteristic can be used to avoid having too many points being mapped into the same indexed value, or appearing on the same ring. As such picking a good reference point is crucial, and a reference point can be used as a tuning factor for effective performance.

5.4 Cluster Based Partitioning

As mentioned, equi-partitioning is expected to be effective only if the data are uniformly distributed. However, data points are often correlated. Even when no correlation exists in all dimensions, there are usually subsets of data that are locally correlated. In these cases, a more appropriate partitioning strategy would be to identify clusters from the data space. However, in high-dimensional data space, the distribution of data points is sparse, and hence clustering is not as straightforward as in low-dimensional databases. There are several existing clustering schemes in the literature such as BIRCH, CURE, and PROCLUS. While our metric based indexing is not dependent on the underlying clustering method, we expect the clustering strategy to have an influence on retrieval performance.

In this paper, we adopt a sampling-based approach. The method comprises four steps. First, we obtain a sample of the database. Second, from the sample, we can obtain the statistics on the distribution of data in each dimension. Third, we select $k_i$ values from dimension i. These $k_i$ values are those values whose frequencies exceed a certain threshold value. We can then form II$k_i$ centroids from these values. For example, in a 2-dimensional data set, we can pick 2 high frequency values, say 0.2 and 0.8, on one dimension, and 2 high frequency values, say 0.3 and 0.6, on another dimension. Based on this, we can predict the clusters could be around (0.2,0.3), (0.2,0.6), (0.8,0.3) or (0.8,0.6), which can be treated as the clusters' centroids. Fourth, we count the data that are nearest to each of the centroids; if there are certain number of data around a centroid, then we can estimate that there is a cluster there.

We note that the third step of the algorithm is crucial since the number of clusters can have an impact on the search area and the number of traversals from the root to the leaf nodes. When the number of clusters is small, more points are likely to have similar distance to a given reference point. On the other hand, when the number of clusters is large, more data spaces, defined by spheres with respect to centroid of clusters, are likely to overlap, and incur additional traversal and searching. Our solution is simple: if the number of clusters is too many, we can merge whose centroids are closest; similarly, if the number of clusters is too few, we can split a large clusters into two smaller ones. We expect the number of clusters to be a tuning parameter, and may vary for different applications and domains.

Figure 9:
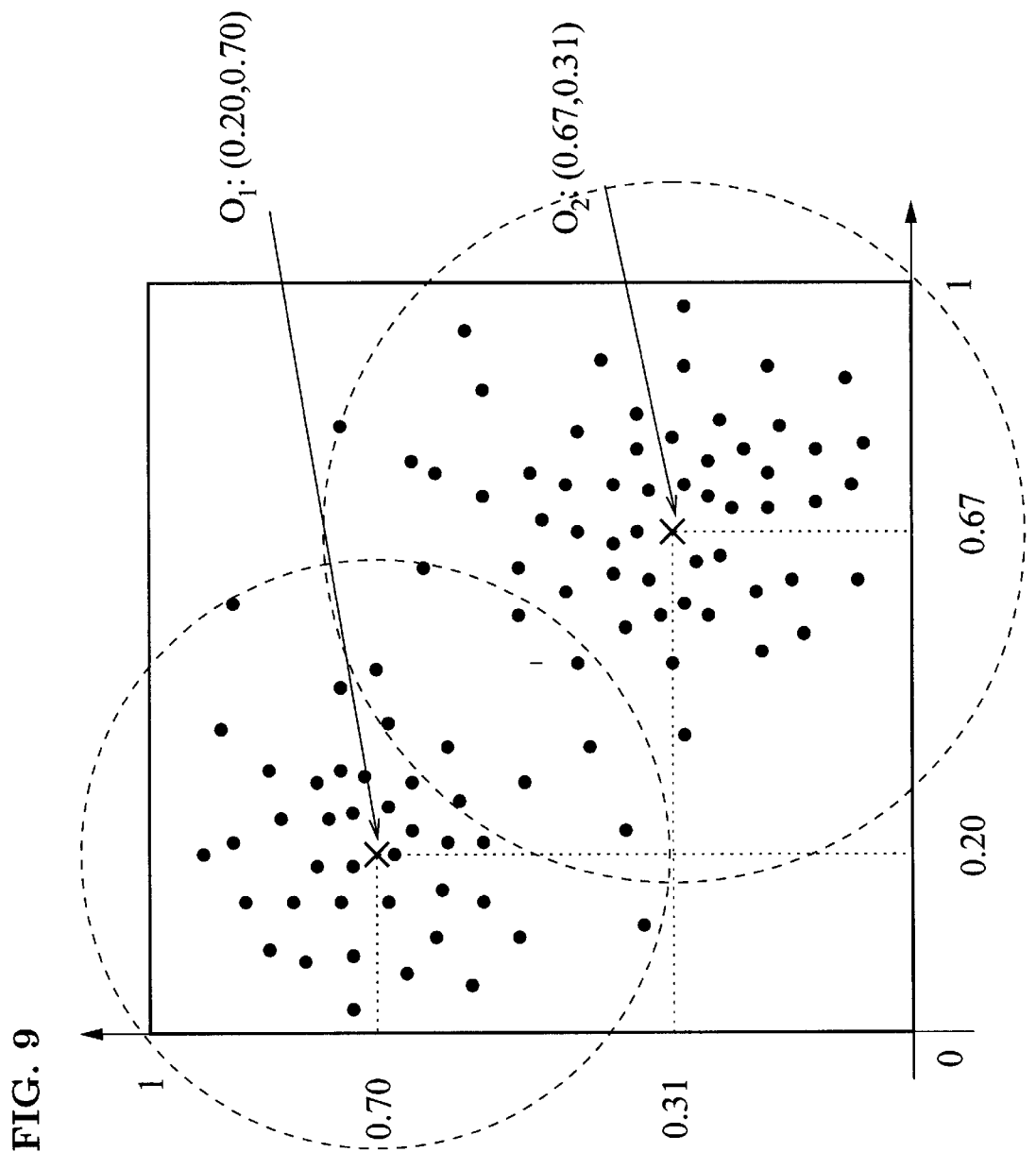
FIG. 9 illustrates the cluster-based space partitioning with cluster centroid as reference point.
Figure 10:
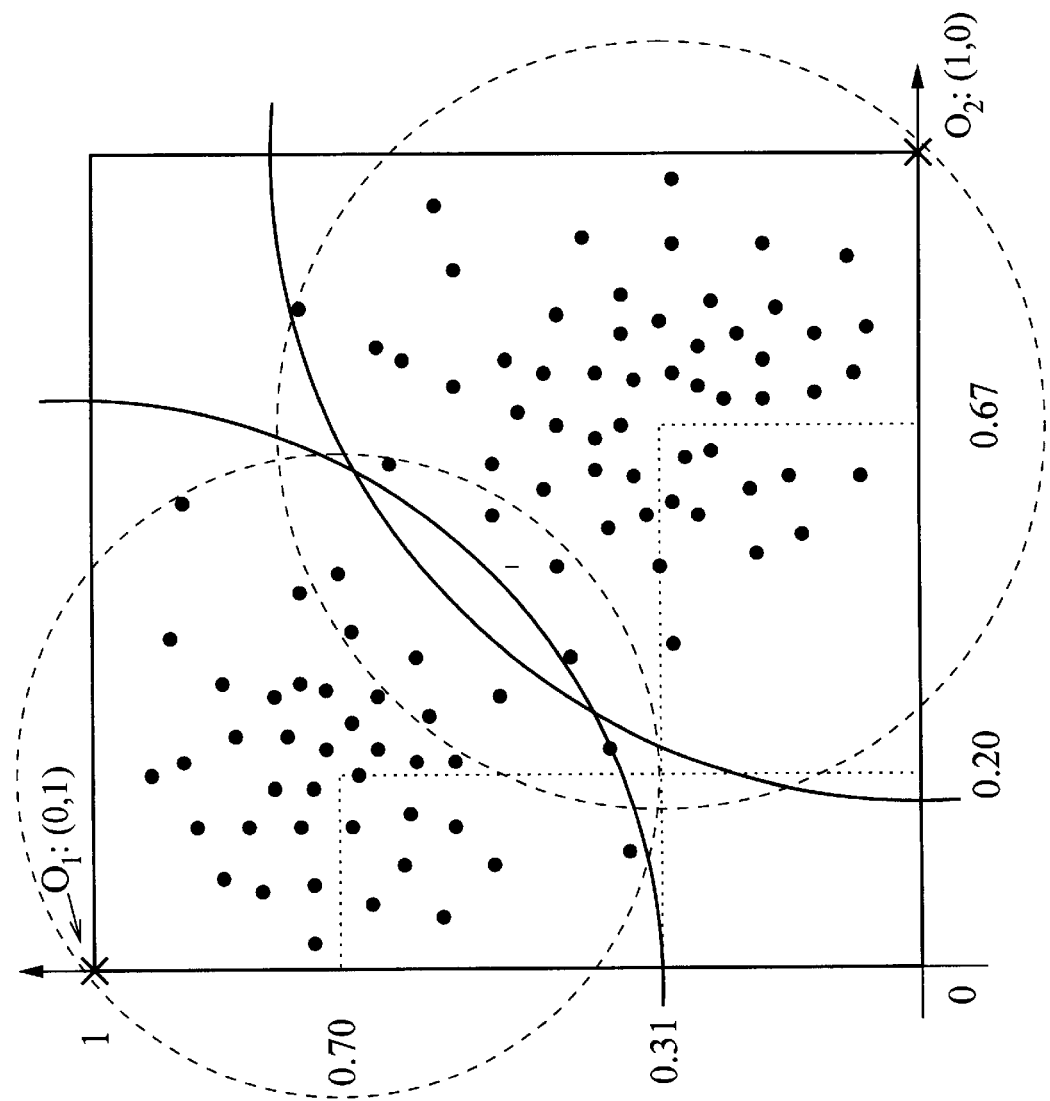
FIG. 10 illustrates the cluster-based space partitioning with edge as reference point.

Once the clusters are obtained, we need to select the reference points. Again, we have several possible options when selecting reference points:

1. Centroid of cluster. The centroid of a cluster is a natural candidate as a reference point. FIG. 9 shows a 2-d example. Here, we have 2 clusters, one cluster has centroid $O_1$ and another has centroid $O_2$.
2. Edge of cluster. As shown in FIG. 9, when the centroid is used, both clusters have to be enlarged to include outlier points, leading to significant overlap in the data space. To minimize the overlap, we can select points on the edge of the hyperplanes as reference points. FIG. 10 is an example of 2-dimensional data space. There are two clusters and the edge points are $O_1$:(0,1) and $O_2$:(1,0). As shown, the overlap of the two partitions is smaller than that using cluster centroids as reference points.

5.5 A Performance Study

To study the effectiveness of iDistance, we conducted an extensive performance study. As reference, we compare iDistance against linear scan (which has been shown to be effective for KNN queries in high dimensional data space) and an extended version of iMinMax($\theta$). iMinMax($\theta$) maps a high dimensional point to either the maximum or minimum value of the values among the various dimensions of the point, and a range query requires d subqueries. we extended iMinMax($\theta$) to support KNN queries, and to return approximate answers progressively. We note that iMinMax ($\theta$) is designed for window queries, and the concept of distance/similarity is not built in. As such, because search is done based on a single dimension, there is no guarantee that any answer set obtained are the K closest neighbors until the entire data set is examined.

We implemented iMinMax($\theta$) and the iDistance technique and their search algorithms in C, and used the $B^+$-tree as the single dimensional index structure. Each index page is 4 KB page. All the experiments are performed on a 300-MHz SUN Ultra 10 with 64 megabytes main memory, running SUN Solaris.

We conducted many experiments using various data sets, with some deriving from LUV color histograms of 20,000 images. For the synthetic data sets, we generated 8, 16, 30-dimensional uniform data sets. The data size ranges from 100,000 to 500,000. For the clustered data sets, we used a clustering algorithm similar to BIRCH to generate the data sets. For each query, a d-dimensional point is used, and we issue five hundreds of such points, and take the average. The relative performance of the various schemes are similar for most of the experiments conducted. Here, we shall report some of the more interesting and representative results.

5.5.1 Effect of Search Radius

In high-dimensional similarity search, the search around the neighborhood is required to find K nearest neighbors. Typically, a small search sphere is used and enlarged when the search condition cannot be met. Hence, it is important to study the effect of search radius on the proposed index methods.

Figure 11:
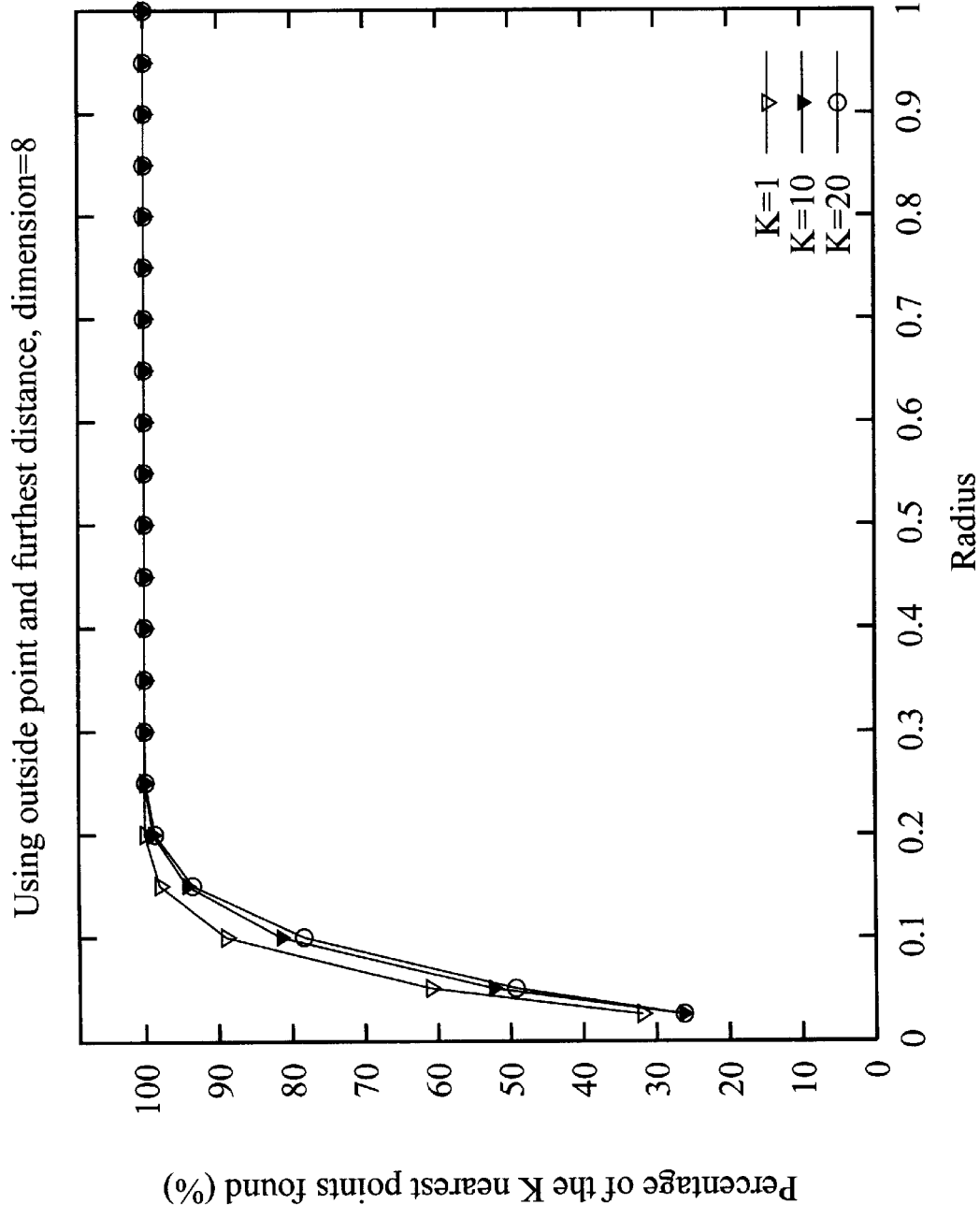
FIG. 11 shows the effect of search radius on retrieval accuracy (dimension=8).
Figure 12:
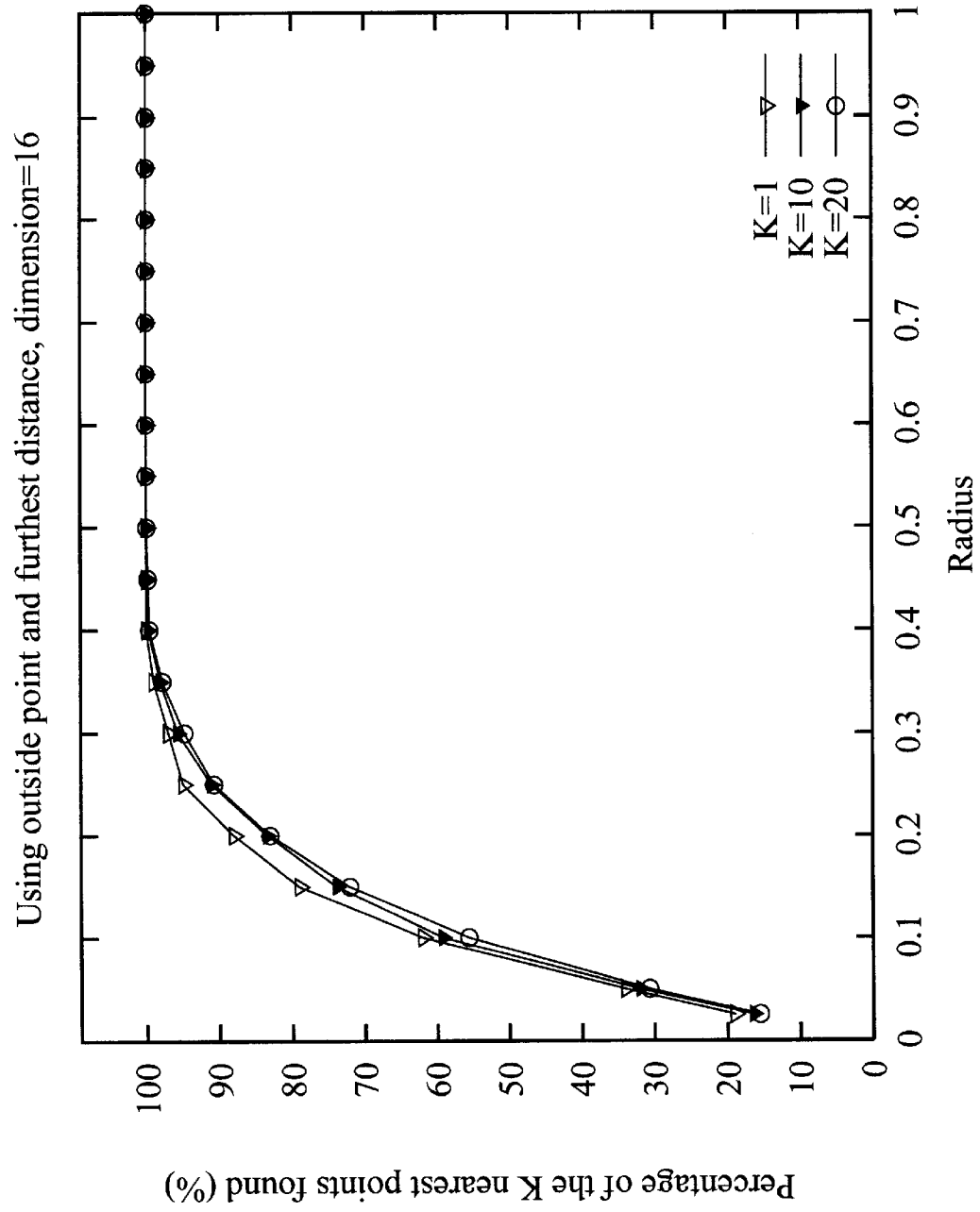
FIG. 12 shows the effect of search radius on retrieval accuracy (dimension=16).
Figure 13:
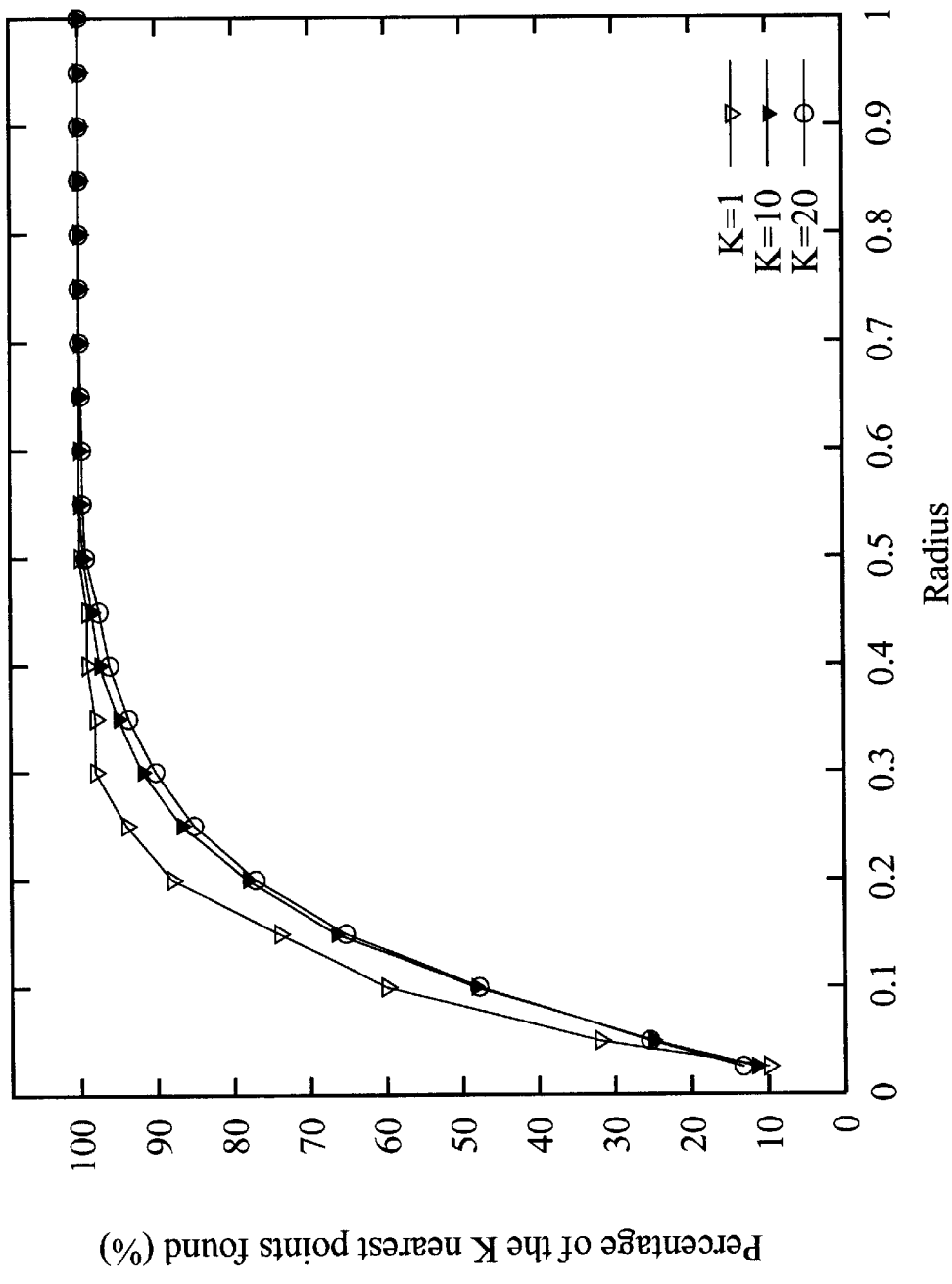
FIG. 13 shows the effect of search radius on retrieval accuracy (dimension=30).

In this experiment, we used 8-dimensional, 16-dimensional and 30-dimensional, 100K tuple uniformly distributed data sets. We use only the (centroid,closest distance) combination in this experiment. FIG. 11-13 show the accuracy of KNN answers with respect to the search radius (querydist). By "accuracy", we refer to the quality of the answers obtained. For example, 50% accuracy for a K NN query means that 50% of the answers obtained so far are in the actual answer set. The results show that as radius increases, the accuracy improves and hits 100% at certain query distance. A query with smaller K requires less searching to retrieve the required answers. As the number of dimension increases, the radius required to obtain 100% also increases due to increase in possible distance between two points and sparsity of data space in higher-dimensional space. However, we should note that the seemingly large increase is not out of proportion with respect to the total possible dissimilarity. We also observe that iDistance is capable of generating lots of nearest neighbors with a small query radius. We shall show the effect of radius on other data distributions and various data partitioning schemes as we discuss other performance issues.

Figure 14:
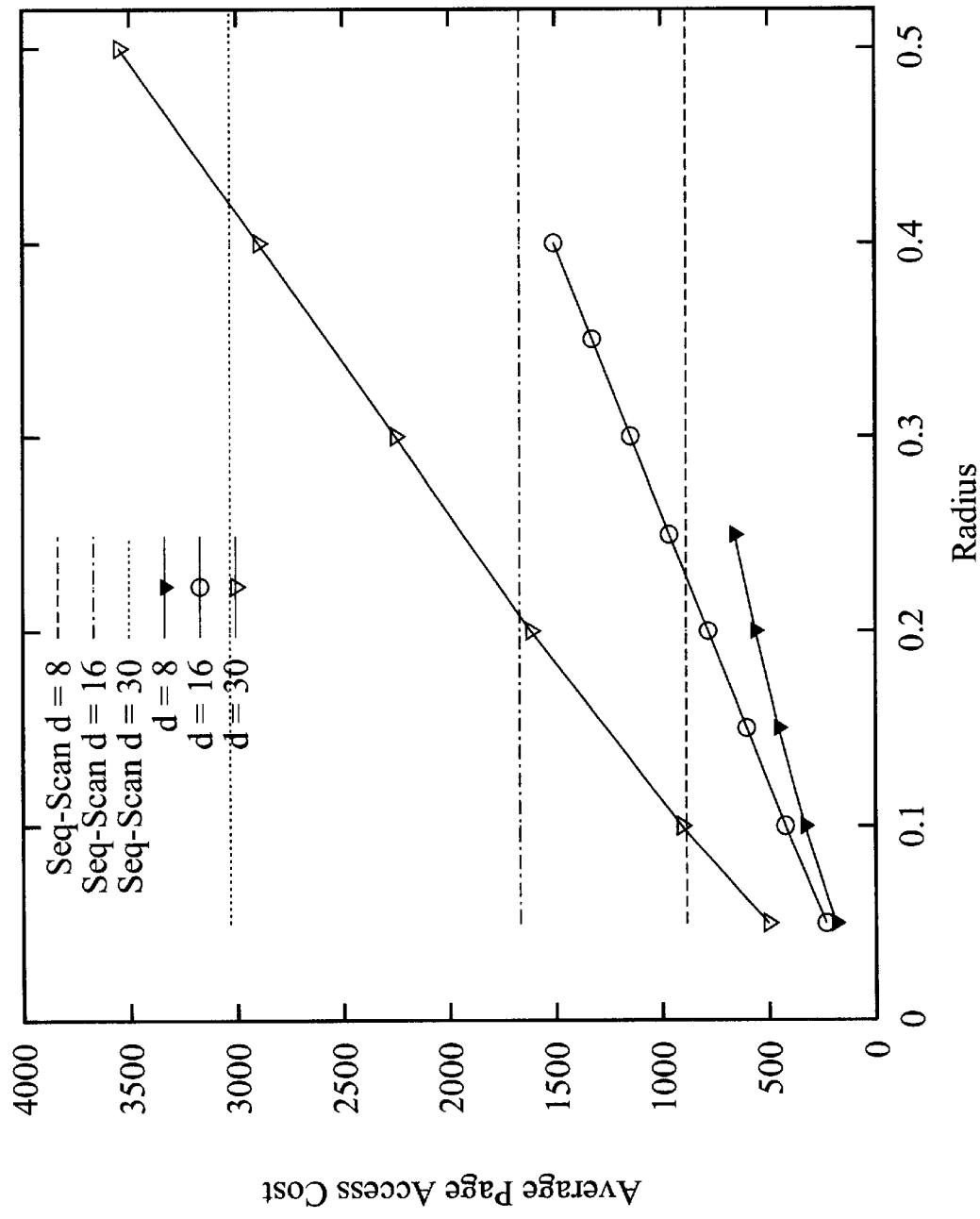
FIG. 14 shows the effect of search radius on retrieval efficiency.

In FIG. 14, we see the retrieval efficiency of iDistance for 10-NN queries. First, we note that we have stopped at radius around 0.5. This is because the algorithm is able to detect all the nearest neighbors once the radius reaches that length. As shown, iDistance can provide fast initial answers quickly (compared to linear scan). Moreover, iDistance can produce the complete answers much faster than linear scan for reasonable number of dimensions (i.e., 8 and 16). When the number of dimensions reaches 30, iDistance takes a longer time to produce the complete answers. This is expected since the data are uniformly distributed. However, because of its ability to produce approximate answers, iDistance is a promising strategy to adopt.

5.5.2 Effect of Reference Points on Equi-Partitioning Schemes

Figure 15:
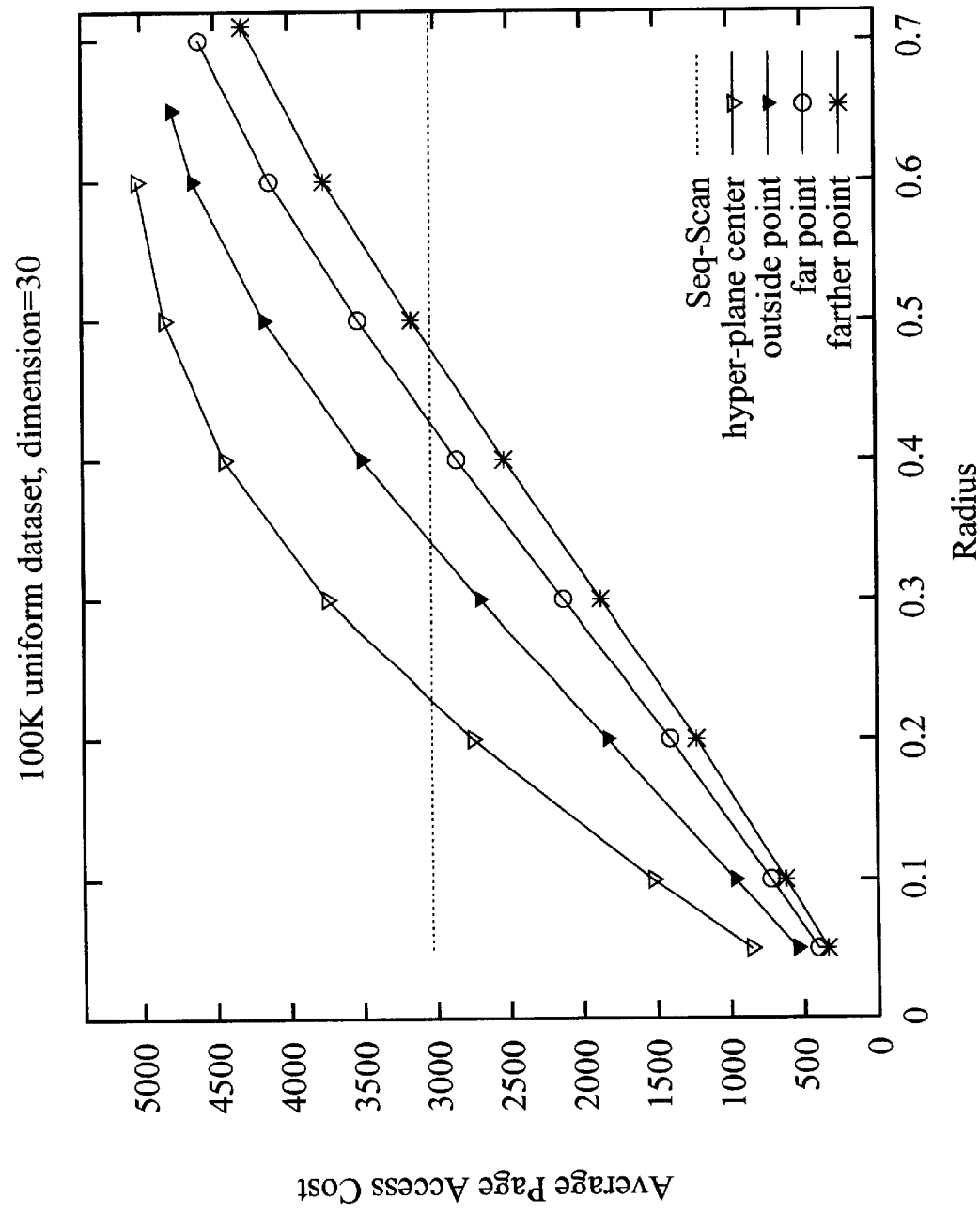
FIG. 15 shows the effect of reference points.

In this experiment, we evaluate the efficiency of equi-partitioning-based iDistance schemes using one of the previous data sets. FIG. 15 shows the results for (centroid, closest) combination with three (external point, closest) schemes. Each of the external points is further away from the hyperplane centroid than the others. First, we note that the I/O cost increases with radius when doing KNN search. This is expected since a larger radius would mean increasing number of false hits and more data are examined. We also notice that it turns out that iDistance-based schemes are very efficient in producing fast first answers, as well as the complete answers. Moreover, we note that the further away the reference point from the hyperplane centroid, the better is the performance. This is because the data space that is required to be traversed is smaller in these cases as the point gets further away. For clustered data sets, we shall illustrate the effect of reference points in the next subsection.

5.5.3 Performance of Cluster-based Schemes

Figure 16:
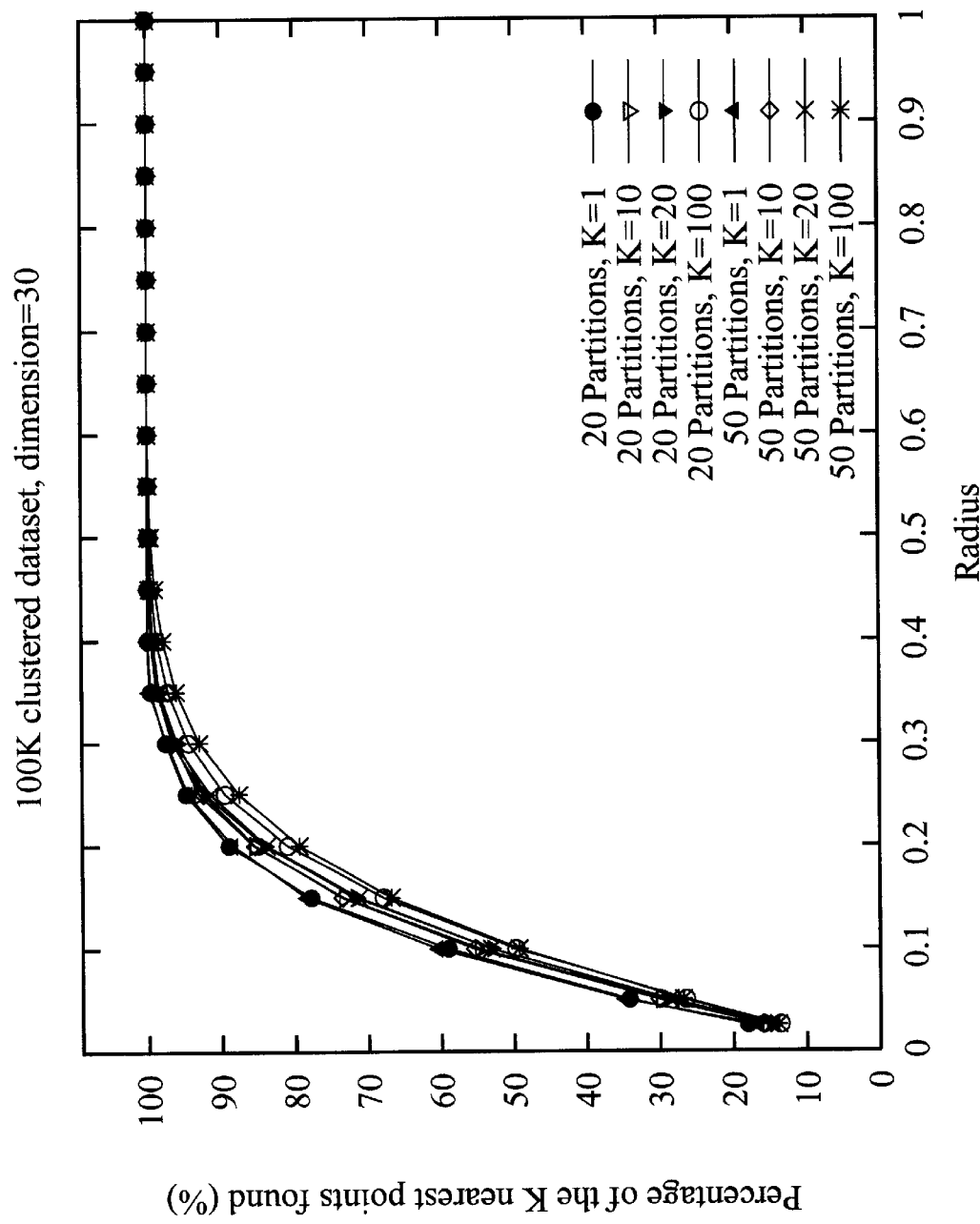
FIG. 16 shows the percentage trend with variant searching radius.
Figure 17:
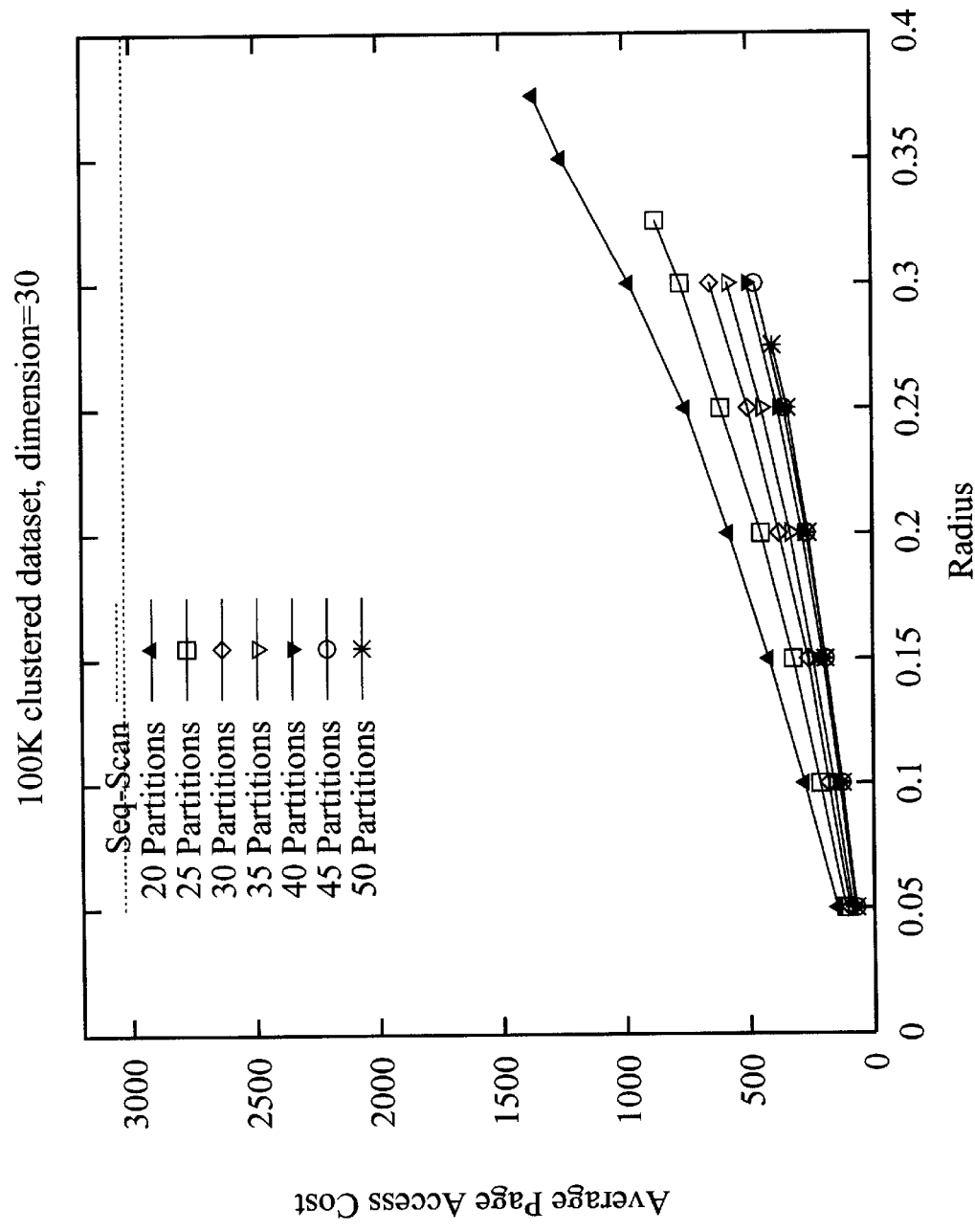
FIG. 17 shows the effect of the number of partitions on iDistance.

In this experiment, we tested a data set with 100K data points of 20 and 50 clusters, and some of the clusters are overlapped with each other. To test the effect of the number of partitions on KNN, we merge some number of close clusters to form a larger partition. We use the edge near to the cluster as its reference point for the partition. Comparison is shown in FIG. 16 and FIG. 17. As with the other experiments, we notice that the complete answer set can be obtained with a reasonably small radius (see FIG. 16). We also notice that a smaller number of partitions performs better in returning the K points. This is probably due to the larger partition size for small number of partitions.

The I/O results for 10-NN is shown in FIG. 17. The results show a slightly different trend. First, we see that the cluster-based scheme can obtain the complete set of answers in a short time. Second, we note that a smaller number of partitions incur higher I/O cost. This is reasonable since a smaller number of partitions would mean that each partition is larger, and the number of false drops being accessed is also higher. Finally, it is clear from the result that iDistance can not only provide fast initial answers, but can outperform linear scan by a wide margin. In this result, iDistance's number of I/Os is at most halve that of linear scan, and be as small as 20% that of linear scan.

Figure 18:
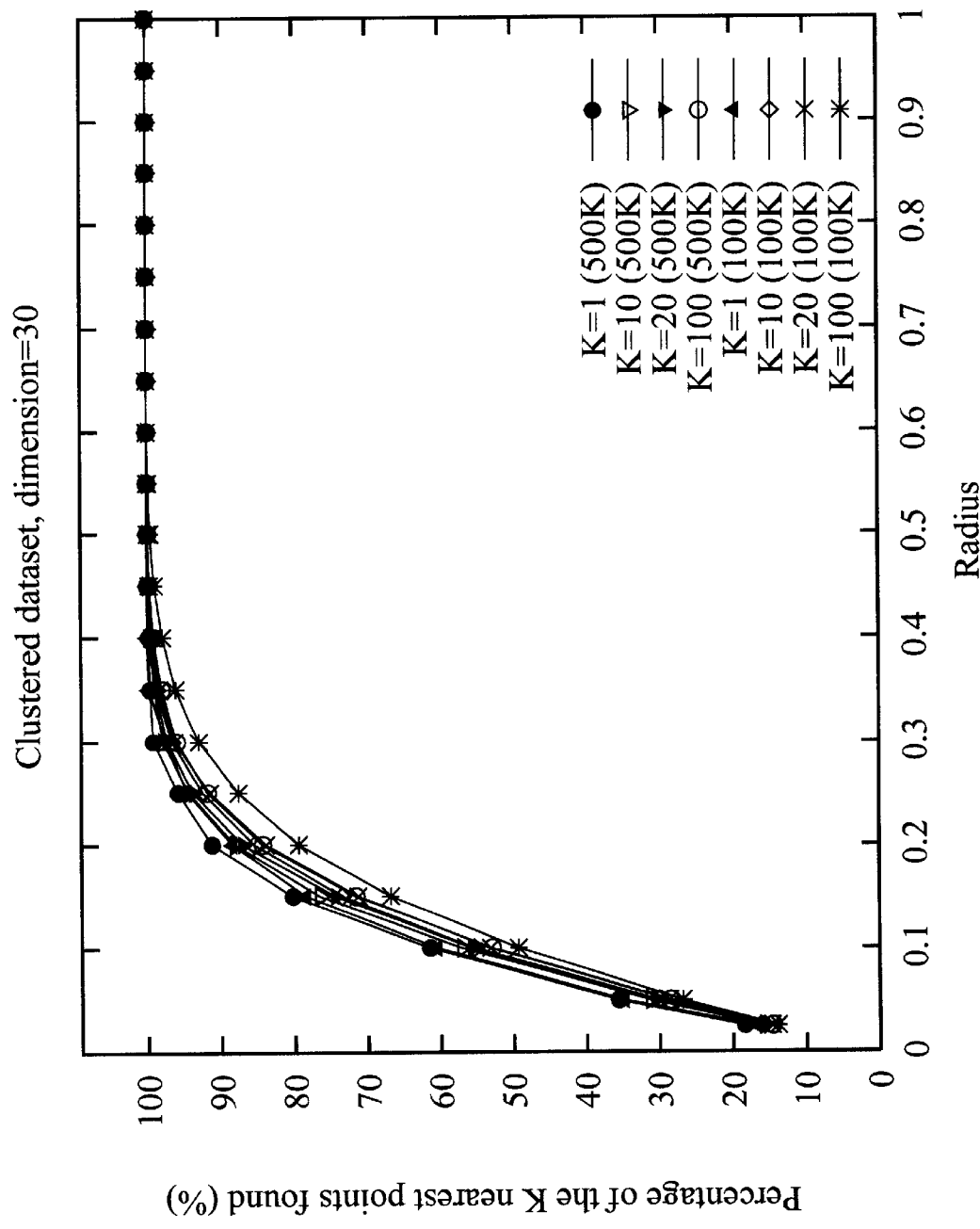
FIG. 18 shows the effect of data size on search radius.
Figure 19:
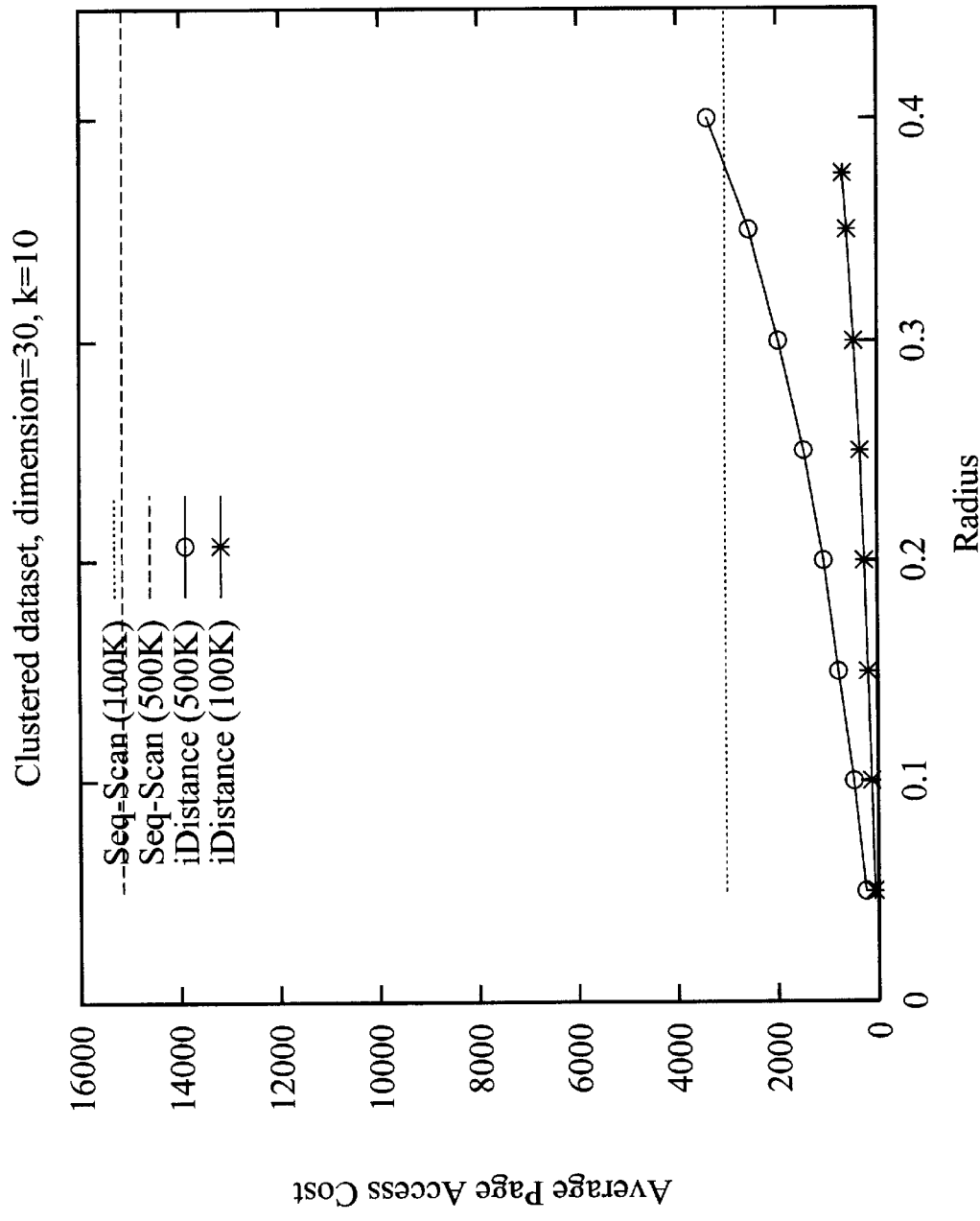
FIG. 19 shows the effect of data size on I/O cost.

We also repeated the experiments for a larger data set of 500K points of 50 clusters using the edge of cluster strategy in selecting the reference points. FIG. 18 shows the searching radius required for locating K (K=1, 10, 20, 100) nearest neighbors when 50 partitions were used. The results show that searching radius does not increase (compared to small data set) in order to get good percentage of KNN. However, the data size does have great impact on the query cost. FIG. 19 shows the I/O cost for 10-NN queries and the speedup factor of 4 over linear scan when all ten NNs were retrieved.

Figure 20:
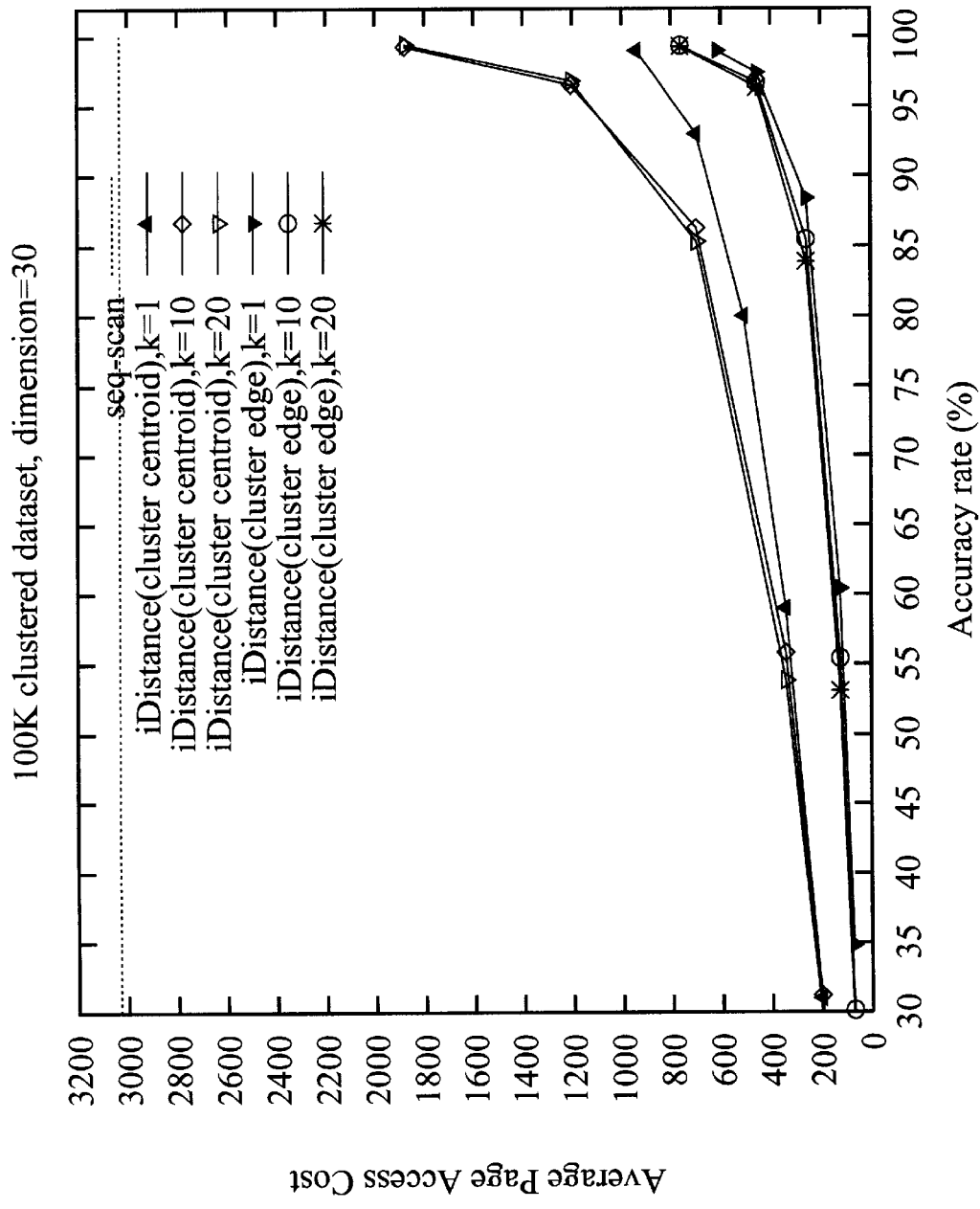
FIG. 20 shows the effect of reference points in clustered data sets.
Figure 21:
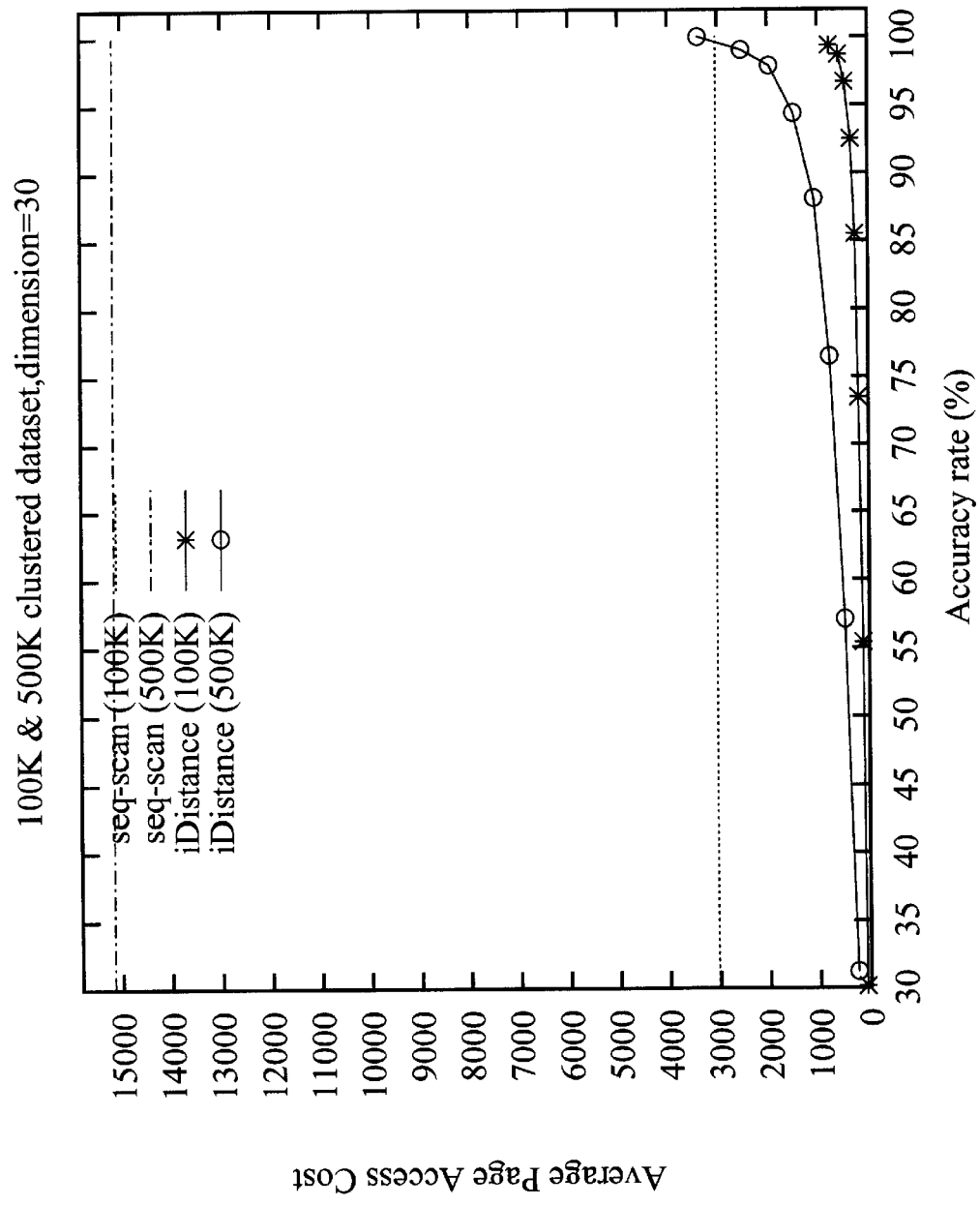
FIG. 21 shows the effect of clustered data size.

FIG. 20 and FIG. 21 show how the I/O cost is affected as the nearest neighbors are being returned. Here, a point (x, y) in the.graph means that x percent of the K nearest points are obtained after y number of I/Os. Here, we note that all the proposed schemes can produce 100% answers at a much lower cost than linear scan. In fact, the improvement can be as much as five times. The results in FIG. 20 also show that picking an edge point to the the reference point is generally better because it can reduce the amount of overlap.

5.5.4 CPU Time

Figure 22:
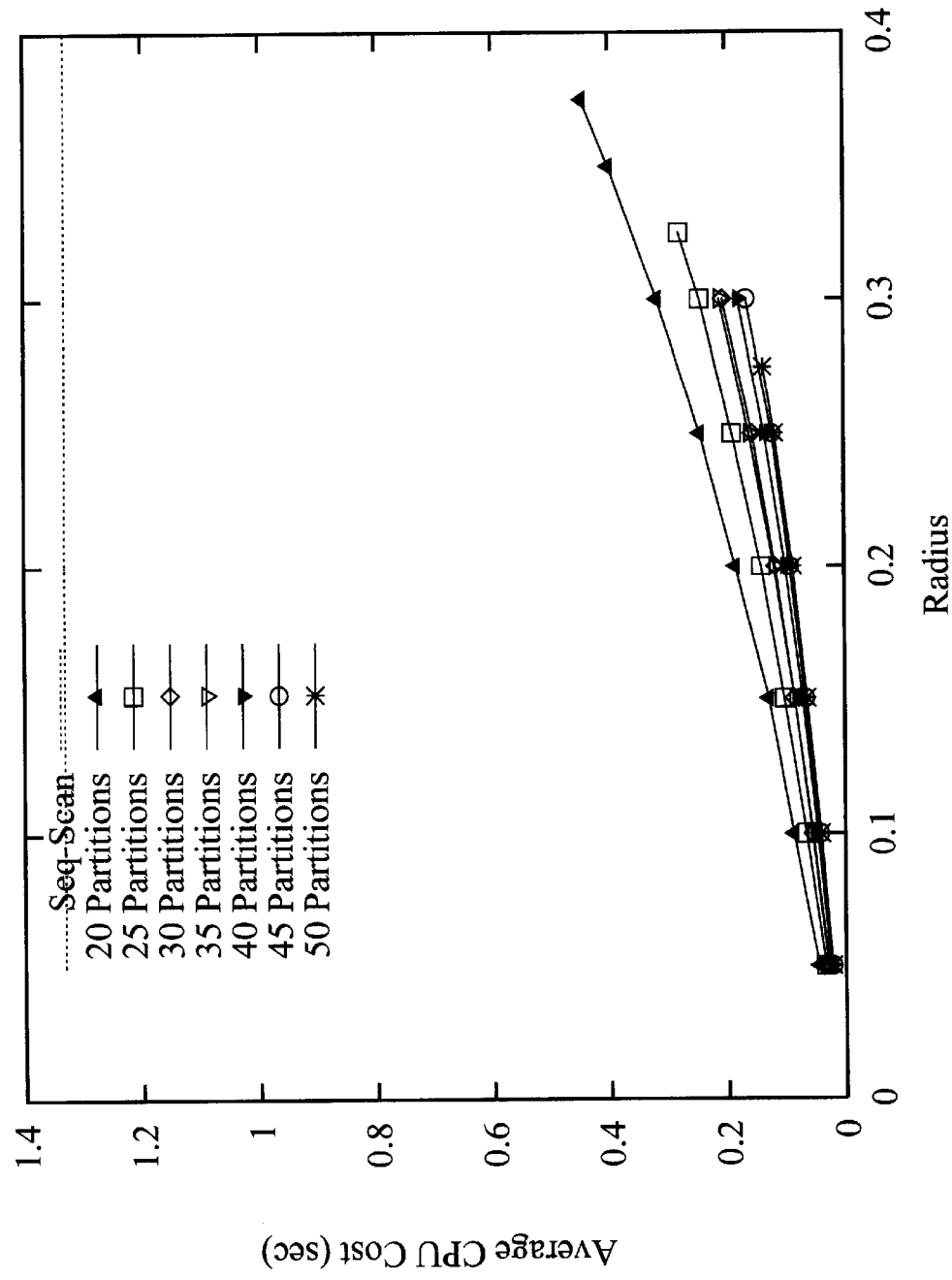
FIG. 22 shows the CPU Time performance of iDistance.

While linear scan incurs less seek time, linear scan of a feature file entails examination of each data point (feature) and calculation of distance between each data point and the query point. Further, due to the limited buffer size, the feature file may be scanned intermittenly. The above factors will have impact on the overall CPU time. FIG. 22 shows the CPU time of linear scan and iDistance for the same experiment as in FIG. 17. It is interesting to note that the performance in terms of CPU time approximately reflects the trend in page accesses. The results show that the best iDistance method achieves about a seven fold increase in speed. We omit iMinMax in our comparison as iMinMax has to search the whole index in order to ensure 100% accuracy, and its CPU time at that point is much higher than linear scan.

Further optimization of B$^+$-trees that could benefit iDistance is possible. For example, since the leaf nodes of a B$^+$-tree are chained, they can be organized into contiguous blocks and each block, rather than a page, can be fetched at a time. However, this requires further study.

5.5.5 A Comparative Study

Figure 23:
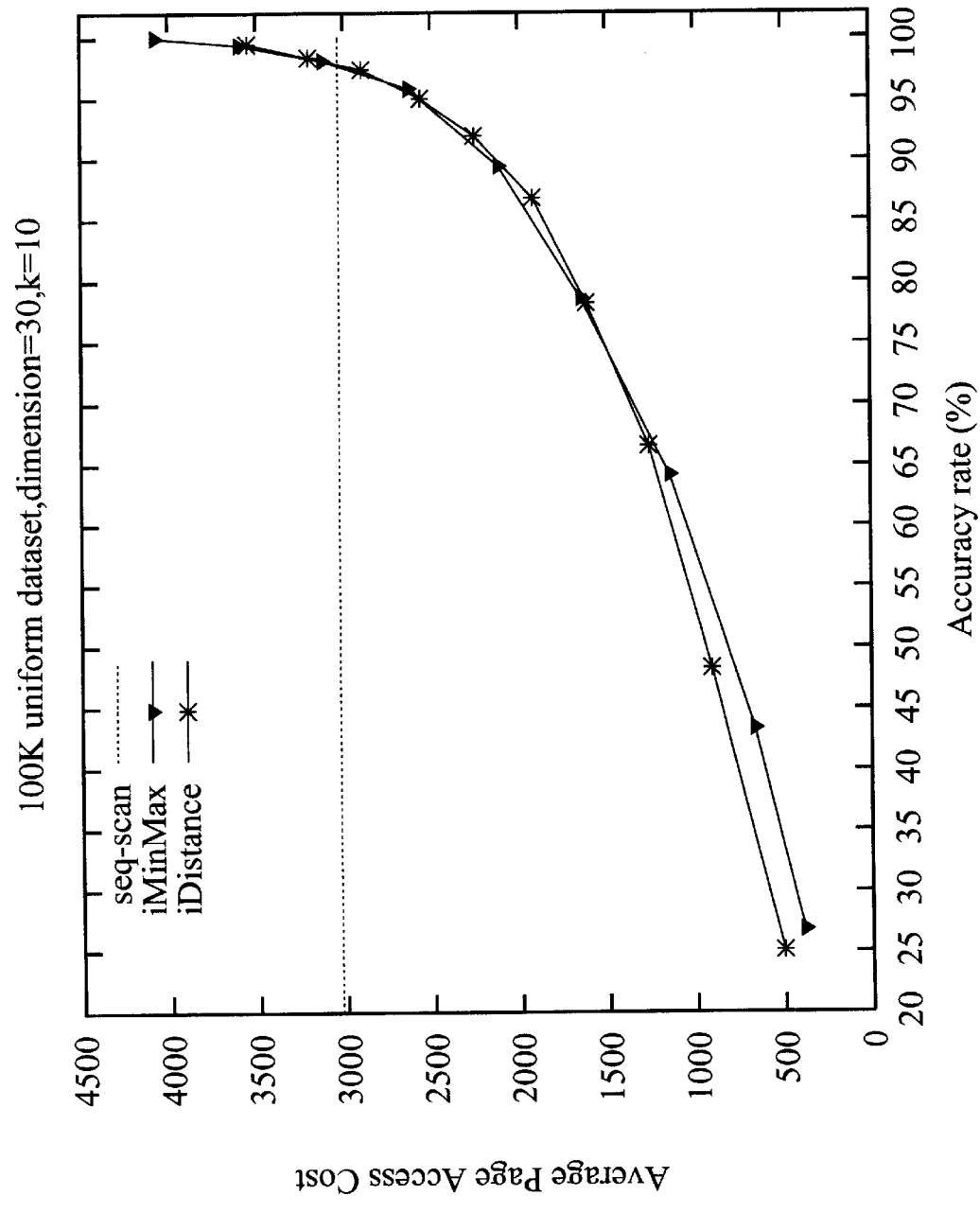
FIG. 23 shows a comparative study on uniform data set.

In this study, we compare iDistance with iMinMax and linear scan. Our first experiment uses a 100K 30-dimensional uniform data set. The query is a 10-NN query. For iDistance, we use the (external point, furthest) scheme. FIG. 23 shows the result of the experiment. First, we note that both iMinMax and iDistance can produce quality approximate answers very quickly compared to linear scan. As shown, the I/O cost is lower than linear scan with up to 95% accuracy. However, because the data is uniformly distributed, to retrieve all the 10 NN takes a longer time than linear scan since all points are almost equidistant to one another. Second, we note that iMinMax and iDistance perform equally well.

Figure 24:
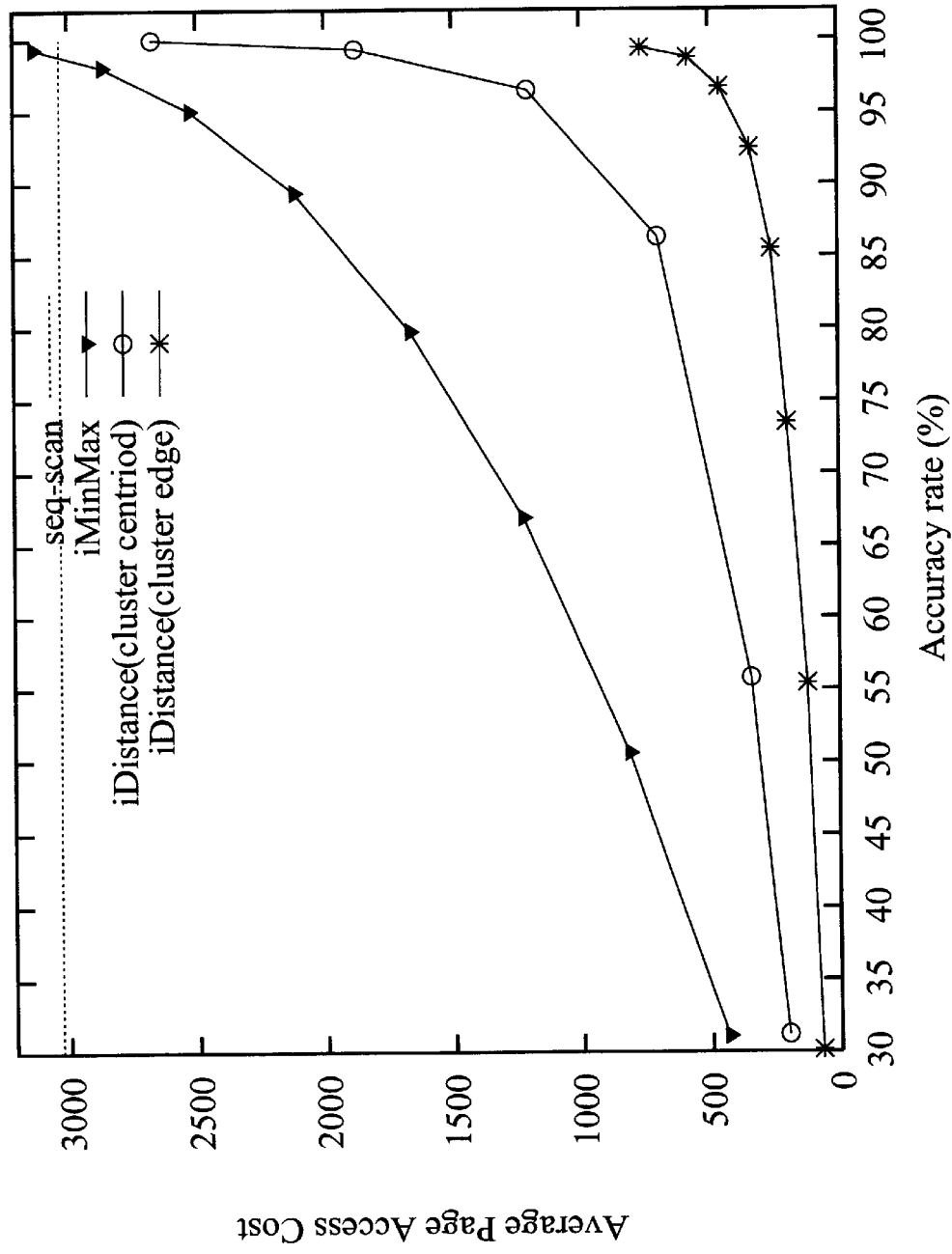
FIG. 24 shows a comparative study on clustered data set.

In another set of experiment, we use a 100K 30-dimensional clustered data set. The query is still a 10-NN query. Here, we study two version of cluster-based iDistance—one that uses the edge of the cluster as a reference point, and another that uses the centroid of the cluster. FIG. 24 summarizes the result. First, we observe that among the two cluster-based schemes, the one that employs the edge reference points performs best. This is because of the smaller overlaps in space of this scheme. Second, as in earlier experiments, we see that the cluster-based scheme can return initial approximate answer quickly, and can eventually produce the final answer set much faster than the linear scan. Third, we note that iMinMax can also produce approximate answers quickly. However, its performance starts to degenerate as the radius increases, as it attempts to search for exact K NNs. Unlike iDistance which terminates once the K nearest points are determined, iMinMax cannot terminate until the entire data set is examined. As such, to obtain the final answer set, iMinMax performs poorly. Finally, we see that the relative performance between iMinMax and iDistance for clustered data set is different from that of uniform data set. Here, iDistance outperforms iMinMax by a wide margin. This is because of the larger number of false drops produced by iMinMax.

What is claimed is:

1. A computerized method for indexing in a database of stored objects, the method comprising:

applying a clustering algorithm to organize high-dimensional points into partitions;

selecting a reference point for each partition;

applying a transformation function to map a high-dimensional point to a one-dimensional space;

indexing the transformed point using a single dimensional index structure; and wherein the transforming includes mapping a high dimensional point p to a single dimensional value y under the transformation function, y=i*c+dist(p,o), where point o is the closest reference point to p, and dist(p,o) represent the distance between p and o, c is an arbitrary constant greater than 1, i is an integer that uniquely identifies o.

2. A method for indexing as defined in claim 1 further comprising conducting a KNN (K nearest neighbor) search on the indexed set of transformed points to retrieve a set of points which represent a superset of objects including desired objects and false drops.

3. A method for indexing as defined in claim 2 further comprising pruning away the false drops.

4. A method for indexing as defined in claim 1 wherein the partitioning of high-dimensional data points is performed either via equi-space partitioning or cluster-based partitioning.

5. A method for indexing as defined in claim 4 wherein the equi-space partitioning splits a d-dimensional data space into 2d pyramids with the centroid of the unit cube space as their tip, and each hyperplane forming the base of each pyramid.

6. A method for indexing as defined in claim 4 wherein the cluster-based partitioning adopts a clustering strategy to obtain the partitions.

7. A method for indexing as defined in claim 1 wherein the selecting of the reference points is performed via the following heuristics:

for equi-space partitioning, the reference point of a partition can be any point along the line formed by the centroid of a hyperplane and the centroid of the corresponding data space; and for cluster-based partitioning, either the centroid of the clusters or any points on the edge of the hyperplanes can be used as reference points.

8. A method for indexing as defined in claim 1 wherein the transforming includes mapping a high-dimensional point to its distance from the closest reference point.

9. A method for KNN search as defined in claim 2 wherein the method further comprises:

transforming the KNN search into a sequence of increasingly larger range queries; and evaluating each range query on the single dimensional index structure storing the transformed points.

10. A method for KNN search as defined in claim 9 wherein approximate answers can be returned to the users as soon as they are found; and the answers are progressively refined until all answers are obtained unless the users terminate prematurely.

11. A method for indexing as defined in claim 2 wherein the desired objects are nearest with respect to a distance metric to the query object.

* * * * *